US008700236B1

(12) United States Patent
Berman

(10) Patent No.: US 8,700,236 B1
(45) Date of Patent: Apr. 15, 2014

(54) MOBILE FLIGHT LOGBOOK SYSTEM AND METHOD

(76) Inventor: Eric R. Berman, Woodinville, WA (US)

(*) Notice: Subject to any disclaimer, the term of this patent is extended or adjusted under 35 U.S.C. 154(b) by 72 days.

(21) Appl. No.: 13/374,840

(22) Filed: Jan. 18, 2012

(51) Int. Cl.
G07C 5/00 (2006.01)
G01C 21/20 (2006.01)
(52) U.S. Cl.
CPC ............. G07C 5/008 (2013.01); G01C 21/20 (2013.01)
USPC .............................................. 701/16; 701/15
(58) Field of Classification Search
CPC ...................................................... G07C 5/008
USPC ............................................. 701/15, 16, 32.3
See application file for complete search history.

(56) References Cited

U.S. PATENT DOCUMENTS

| 8,374,733 | B2* | 2/2013 | Dexheimer et al. ................ 701/3 |
| 2002/0103865 | A1* | 8/2002 | Lilly ............................. 709/205 |
| 2010/0073197 | A1* | 3/2010 | Eagleton et al. ............... 340/945 |
| 2011/0246000 | A1* | 10/2011 | Shavit .............................. 701/14 |

* cited by examiner

Primary Examiner — John R Olszewski
Assistant Examiner — Todd Melton
(74) Attorney, Agent, or Firm — Kyle H. Flindt

(57) ABSTRACT

Flight entries in a flight logbook maintained on a flight server are automatically generated using a remote location-aware mobile device. The remote location-aware device automatically detects aircraft takeoff and landing. The flight server posts designated flight information from the flight logbook to a plurality of social networks.

20 Claims, 32 Drawing Sheets

2800b

| | New Flight | Reset Options |
|---|---|---|

| Date: | Jun 02, 2011 | Aircraft: | |
|---|---|---|---|
| Comments: | | | |
| Route: | WA04 | | Nearest ⊙ |

*In the Cockpit*

| Hobbs start: | 3.3 | Engine Start (UTC): | 2011-06-02 18:49 | Flight Status: On Ground |
|---|---|---|---|---|
| Takeoff (UTC): | 2011-06-02 18:53 | Landing (UTC): | (Tap for Now) | Speed: -- |
| Engine Stop (UTC): | (Tap for Now) | Hobbs End: | | GPS quality: Poor |

*Landings and Approaches*

| Approaches: | 0 | Landings: | 0 | |
|---|---|---|---|---|
| Hold: | | Day Full-stop: | 0 | Night Full-stop: 0 |

*Flight Times & Properties*

| Night: | 0.0 | Sim. IMC: | 0.0 |
|---|---|---|---|
| IMC: | 0.0 | X-Country: | 0.0 |
| Dual: | 0.0 | Ground Sim: | 0.0 |
| CFI: | 0.0 | SIC: | 0.0 |
| PIC: | 0.0 | Total time: | 0.0 | Properties |

*Fig. 28b*

MOBILE FLIGHT LOGBOOK SYSTEM AND METHOD

CROSS REFERENCE TO RELATED APPLICATIONS

The present application is a non-provisional application that claims priority and incorporates by reference in its entirety U.S. Provisional Patent Application No. 61/115,538, entitled "Mobile Flightbook System and Method" filed on Jan. 15, 2011.

FIELD

The present disclosure relates to maintaining an online flight logbook to help track flying activities for a pilot, and more particularly, to systems and methods for recording and publishing related flight information.

BACKGROUND

Currently there is not a regulation or requirement to track every flight a pilot takes; however, most pilots prefer to track as many flights as possible to ensure that the pilot is logging the flights that are required for license certification. For example, an accurate flight logbook may help a pilot keep track of their total flight hours and demonstrate that they are "current" for a particular type of flight. More specifically, as outlined in the Federal Aviation Regulation (FAR) 14 CFR §61.57(a) "no person may act as a pilot in command of an aircraft carrying passengers or of an aircraft certificated for more than one pilot flight crewmember unless that person has made at least three takeoffs and three landings within the preceding 90 days." Similarly, FAR 14 CFR §61.57(b) indicates that "no person may act as pilot in command of an aircraft carrying passengers during the period beginning 1 hour after sunset and ending 1 hour before sunrise, unless within the preceding 90 days that person has made at least three takeoffs and three landings to a full stop during the period beginning 1 hour after sunset and ending 1 hour before sunrise." Thus to legally engage in certain types of flying, the pilot must be "current" for that type of flight, meaning that they must have performed certain flight activities within a specified time period prior to the proposed flight. By recording these events in a flight logbook, pilots can verify whether they are legal to make a given flight, and can answer relevant detailed questions about their flight experience.

Pilots have historically kept track of their flying in paper logbooks, but over the past decade or so manual entry electronic versions have become more popular. For example, some pilots use a simple spreadsheet to track their flying electronically. Other pilots use tools, such as LogbookPro®, which are primarily desktop-based applications that keep a data file on the user's PC, but may have an option to back up the data file to an Internet-based server.

Unfortunately, each of the available logbook options mentioned above are also associated with a different set of problems for the pilot using them. Paper logbooks, though still quite common, are perhaps the most problematic as individual entries are subject to a variety of accuracy errors, plus there is no easy way to backup the logbook, which is important since paper logbooks can be easily lost or destroyed. More important, the information in the paper logbook is not readily accessible so that answering even simple insurance or currency questions are very difficult. While spreadsheets are more easily backed up and corrections are more easily made, reporting from them can still be difficult. Moreover, since the spreadsheet does not identify particular semantics of flight data, the individual spreadsheet entries are also very prone to input errors adding further to reporting challenges. Desktop-based applications, while better, still keep the data on the pilot's PC or laptop, so that access is really only available when the pilot is at their PC. Some desktop-based applications like LogbookPro® can sync to the web as a backup, but the web is only a backup; the pilot does not have universal access to their logbook data. More specifically, the pilot may not access the stored data unless they are using the computer that generated the original data file. Even web-based solutions that provide universal access regardless of the computer being used and automatic back-up of data, are only accessible for data entry and review when the pilot is connected to the website, which is generally not available during a flight.

In addition to these individual problems, the available logbooks options all share at least two deficiencies. Namely, none of these logbook solutions collect any data other than what the pilot explicitly enters and all of the available logbook solutions limit what is stored to flight facts, because they lack the ability to share great flight experiences with friends and elicit their feedback.

BRIEF DESCRIPTION OF THE DRAWINGS

FIG. 28B illustrates a screenshot of a new flight data entry page for a tablet in accordance with one embodiment.

DESCRIPTION

Figure 1:
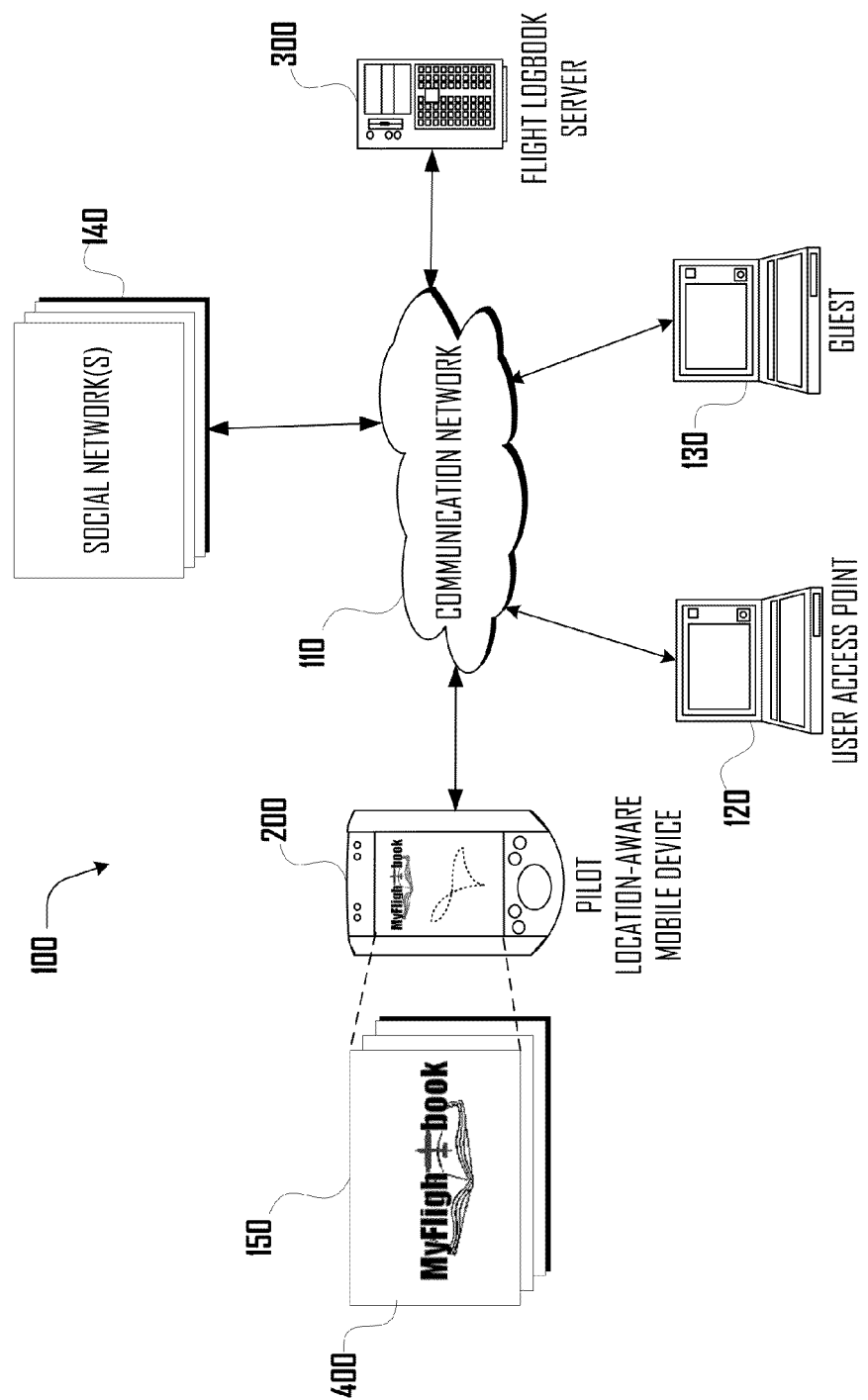
FIG. 1 illustrates a suitable operating environment for mobile flight logbook systems in accordance with at least one embodiment.

In accordance with various embodiments of the invention, a mobile flight logbook system and method are described that overcome the hereinafore-mentioned disadvantages of the heretofore-known devices of this general type and that provide automatic generation of a flight logbook entry using a remote location-aware mobile device and then store the generated entry in an online flight logbook maintained on a flight server. Among other features, the remote location-aware device automatically detects aircraft takeoffs and landings for the pilot and populates flight logbook entry based on information available to the location-aware mobile device. Moreover, in one embodiment, the flight server collects other flight information from the remote location-aware device, including photographs associated with the flight, and may selectively post designated flight information from the flight logbook to a plurality of social networks in accordance with the pilot profile. Examples of such a flight logbook service and associated mobile application, which allows a pilot to update and/or view their flight logbook from a location-aware mobile phone, such as the iPhone® or Android® smartphone, in accordance with at least one embodiment as described, may be obtained from MyFlightbook, LLC (see e.g., http://www-.myflightbook.com).

The detailed description that follows is represented largely in terms of processes and symbolic representations of operations by conventional computer components, including a processor, memory storage devices for the processor, connected display devices and input devices. Although conventional computer components have been described that generally conforms to conventional general purpose computing devices, a mobile flight logbook system may include any of a great number of devices capable of communicating with a communications network, such as the Internet. Furthermore, these processes and operations may utilize conventional computer components in a heterogeneous distributed computing environment; including remote file servers, computer servers, publishing resources, and/or memory storage devices. Each of these conventional distributed computing components is accessible by the processor via a communication network. In a heterogeneous distributed computing environment, clients, servers, and client/servers may be, for example, mainframes, minicomputers, workstations, or personal computers. Most services in a heterogeneous distributed computing environment can be grouped into one of these major categories: distributed file system, distributed computing resources, and messaging. A distributed file system provides a client with transparent access to part of the mass storage of a remote network device, such as a server. Distributed computing resources provide a client with access to computational or processing power of remote network devices, such as a cloud server. In one embodiment, distributed computing resources also provide a client with access to remote resources, such as printing/publication assets associated with remote network devices.

The phrases "in one embodiment," "in various embodiments," "in some embodiments," and the like are used repeatedly. Such phrases do not necessarily refer to the same embodiment, but they may unless the context dictates otherwise. The terms "comprising," "having," and "including" are synonymous, unless the context dictates otherwise. For purposes of this application, the term "aircraft" refers to a vehicle that is able to fly and may include a plane (e.g., propeller plane, jet plane, or glider), rotorcraft (e.g., helicopter), or aerostat (e.g., blimp or balloon). The terms "flight information" and "flight data" are synonymous and generally refer to data collected for a particular flight. Flight information may include a variety of information associated with the flight, such as the date of the flight, aircraft information (e.g., aircraft registration number (tail number), make, and model), route of flight, number of landings, number of instrument approaches, amount of time spent as member of flight crew, any multimedia (e.g., video, sound, or photographs) associated with the flight, comments about the flight, and any other information that may be useful to the pilot or necessary for regulatory, employment, or insurance purposes. The route of flight may include a starting airport, any intermediate airports, and a final airport. The time spent on the flight crew may be divided into time spent as pilot in command, second in command, or in various other roles. The term "remote device" refers to any separate digital device in communication with the "local device" via a communication network. The terms "mobile device", "handheld device", and "handheld computer" are synonymous and generally refer to any small handheld computing device. The term "location-aware" refers to the ability of a device to passively or actively determine their location. Examples of acceptable location-aware devices include a smartphone, personal computer, or any other device that is capable of providing navigational information and/or accessing a third party navigation system, such as a Global Positioning System (GPS) or Galileo for satellite navigation information. For purposes of this application, the terms "network", "computer network", and "communication" are synonymous and generally refer to a collection of hardware components and computers interconnected by communication channels that allow sharing of resources and information. Both a local area network (LAN) and a wide area network (WANs) are examples of computer networks that acceptably interconnect computers within the scope of this application. It may also be noted that when a device has a direct electro-physical connection (e.g., directly tethered) to a computer then the device would not be considered connected to the computer via a network. In the discussions that follow, the terms "auto-detection" or "detection" refer to identifying/noticing that a particular event has occurred. Key uses for the auto-detect term are identifying takeoffs and landings, but this term should not exclude other possible uses, such as detecting the transition between day and night at the user's current position (important for determining whether a landing occurs at night and thus qualifies to make the pilot current at night), using a terrain database to detect and alert the pilot to an impending collision with a mountain. Similarly, the term "auto-fill" as used herein typically refers to the device filling in a piece of flight-related data on behalf of the pilot without the pilot having to do so themselves.

Reference is now made in detail to the description of the embodiments as illustrated in the drawings. Particular embodiments described in this application provide specific case implementations of mobile flight logbook systems and methodologies, which collect flight information via a remote location-aware mobile device and transmit the collected flight information to a flight server. The remote location-aware mobile device automatically generates an entry for a flight logbook, including actively updating the number of detected landings associated with the flight. The flight server, based on the preferences of the pilot, may post designated flight information to at least one social network. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments.

Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

Referring now to FIG. 1, a suitable operating environment 100 for mobile flight logbook systems is shown in accordance with at least one embodiment. The environment 100 may include a remote location-aware mobile device 200 associated with a pilot coupled via communications network 110 to a flight server 300. In one embodiment, the flight server 300 may support multiple pilots, each pilot may have at least one flight logbook 400 and be associated with at least one social network 140. In one embodiment, the remote location-aware mobile device 200 may generate a flight entry from collected flight data 150 for a flight logbook 400. The flight logbook may include both flight data describing facts of the flight and pilot experience data sharing notable experiences in the context of the flight. Examples of pilot experience data may include personal notes and multimedia, such as pictures and video, taken during the flight to better share the experience with those reviewing the flight later.

Once the remote location-aware mobile device 200 uses the flight data 150 to generate an flight entry, the flight entry may be reported to the flight server 300 for inclusion in a flight logbook 400 associated with a pilot. The flight logbook 400 is accessible on the flight server by a pilot using a user access point 120 or by a guest device 130 approved by the pilot. In one embodiment, designated portions of the flight logbook 400 may be shared with at least one social network 140. In this way, guests and friends of the pilot may receive links to flight information in the flight logbook 400. In one embodiment, posts directed to at least one social network 140, which may include a variety of the active third party social network service providers, may be adjusted relative to designated preferences of each pilot and to available content collected for each flight. In one embodiment, a flight post option may be executed by the remote location-aware mobile device 200 or a user access point 120 and subsequently adjusted according to established relationships with other registered flight server users, social networks, and anonymous guest users. In this manner, one button may submit the flight to the logbook and cause designated flight information to be posted in accordance to the pilot's preferences once the flight is in the flight server database. In one embodiment, a portion of the post may include a link back to the flight logbook 400, so that changes to the flight logbook 400 will immediately be "reflected" through the link to the designated targets of the post, so there is no need to repost flight updates after changes are made.

Figure 2:
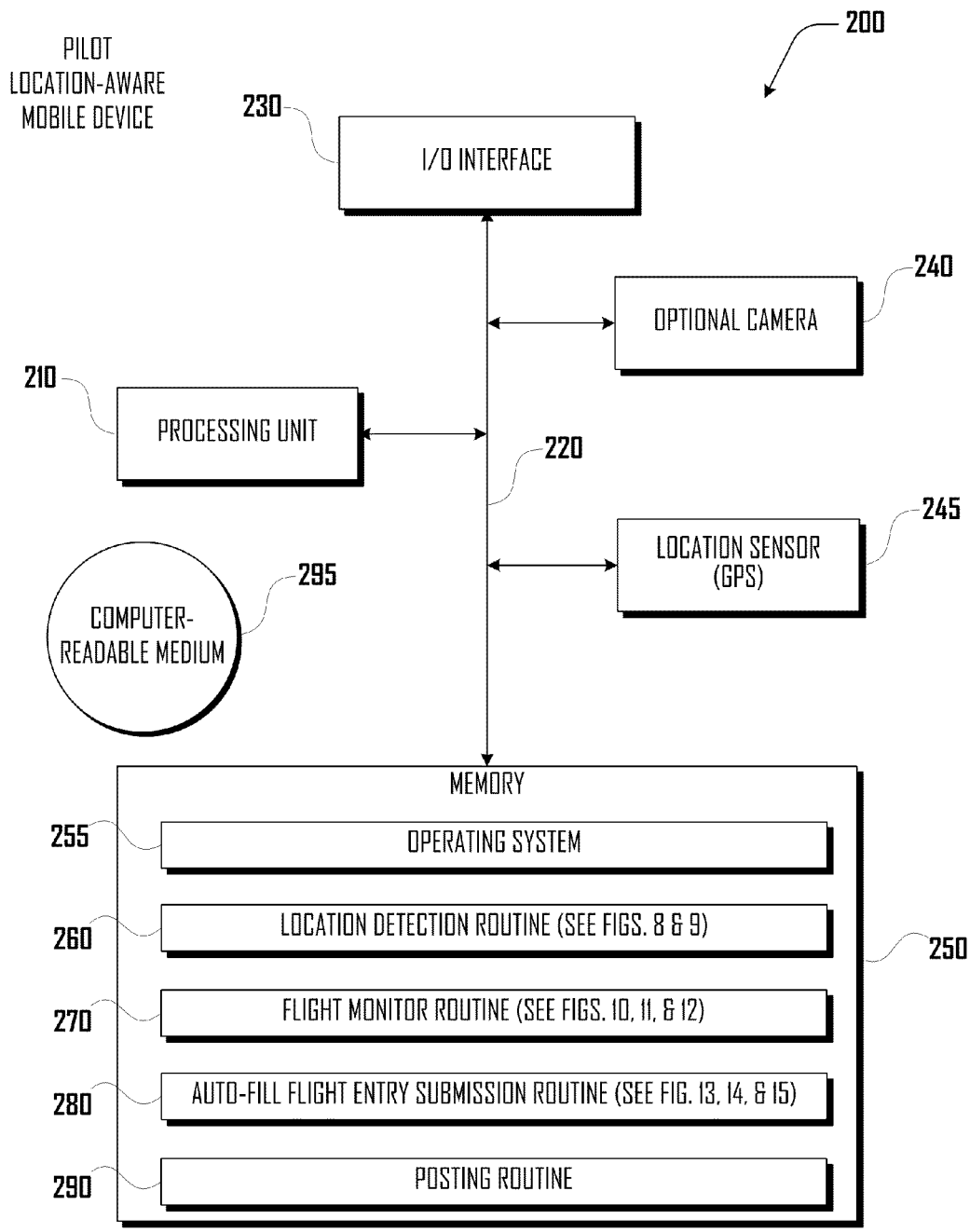
FIG. 2 illustrates several components of a location-aware mobile device that may be used by a pilot in accordance with one embodiment.

Referring now to FIG. 2, several components of a location-aware mobile device 200 associated with a pilot are shown in accordance with one embodiment. In some embodiments, the location-aware mobile device 200 may include many more components than those shown in FIG. 2. However, it is not necessary that all of these generally conventional components be shown in order to disclose an illustrative embodiment.

As shown in FIG. 2, the location-aware mobile device 200 includes a location sensor 245 for providing navigational information and/or accessing a third party navigation system, such as a Global Positioning System (GPS) or Galileo to obtain satellite navigation information. In one embodiment, the location-aware mobile device 200 has an Input/Output (I/O) communication interface 230 for connecting to the flight server 300 across a communications network 110, e.g., the Internet. The I/O communication interface 230 may also include a variety of Input/Output ports that each serve as a potential interface between the location-aware mobile device 200 and other computers or peripheral devices and may include Ethernet, FireWire, Serial, Parallel, coaxial cable, and Universal Serial Bus (USB) ports. The location-aware mobile device 200 also includes a processing unit 210, a memory 250, and an optional camera 240, all interconnected, along with the I/O communication interface 230, via a bus 220. The memory 250 generally comprises a random access memory ("RAM"), a read only memory ("ROM"), and a permanent mass storage device, such as a disk drive.

The memory 250 may store program code for a location detection routine 260 (see FIGS. 8 and 9, discussed below), a flight monitor routine 270 (see FIGS. 10, 11, and 12, discussed below), an auto-fill flight entry submission routine 280 (see FIGS. 13, 14, and 15, discussed below), and a posting routine 290. In addition, the memory 250 also stores an operating system 255. These software components may be loaded from a non-transient computer readable storage medium 295, on which the software components are tangibly embodied, into memory 250 of the flight server 300 using a drive mechanism (not shown) associated with a computer readable storage medium, such as a floppy disc, tape, DVD/CD-ROM drive, memory card, or the like. In some embodiments, software components may also be loaded via the I/O communication interface 230, rather than via a computer readable storage medium 295. In some embodiments, the location-aware mobile device 200 may also communicate via bus 220 with a database (not shown) or other local or remote data store. In various embodiments, bus 220 may comprise a storage area network ("SAN"), a high-speed serial bus, and/or other suitable communication technology. In one embodiment, the location-aware mobile device 200 may be any digital device capable of obtaining and executing network applications, for example, a personal game console, a handheld computer, a cell phone, or any other suitable mobile device. In some embodiments, some or all of the systems and methods disclosed herein may also be applicable to non-mobile client devices, such as a personal computer, a set-top box, integrated aircraft computer system, and the like.

Figure 3:
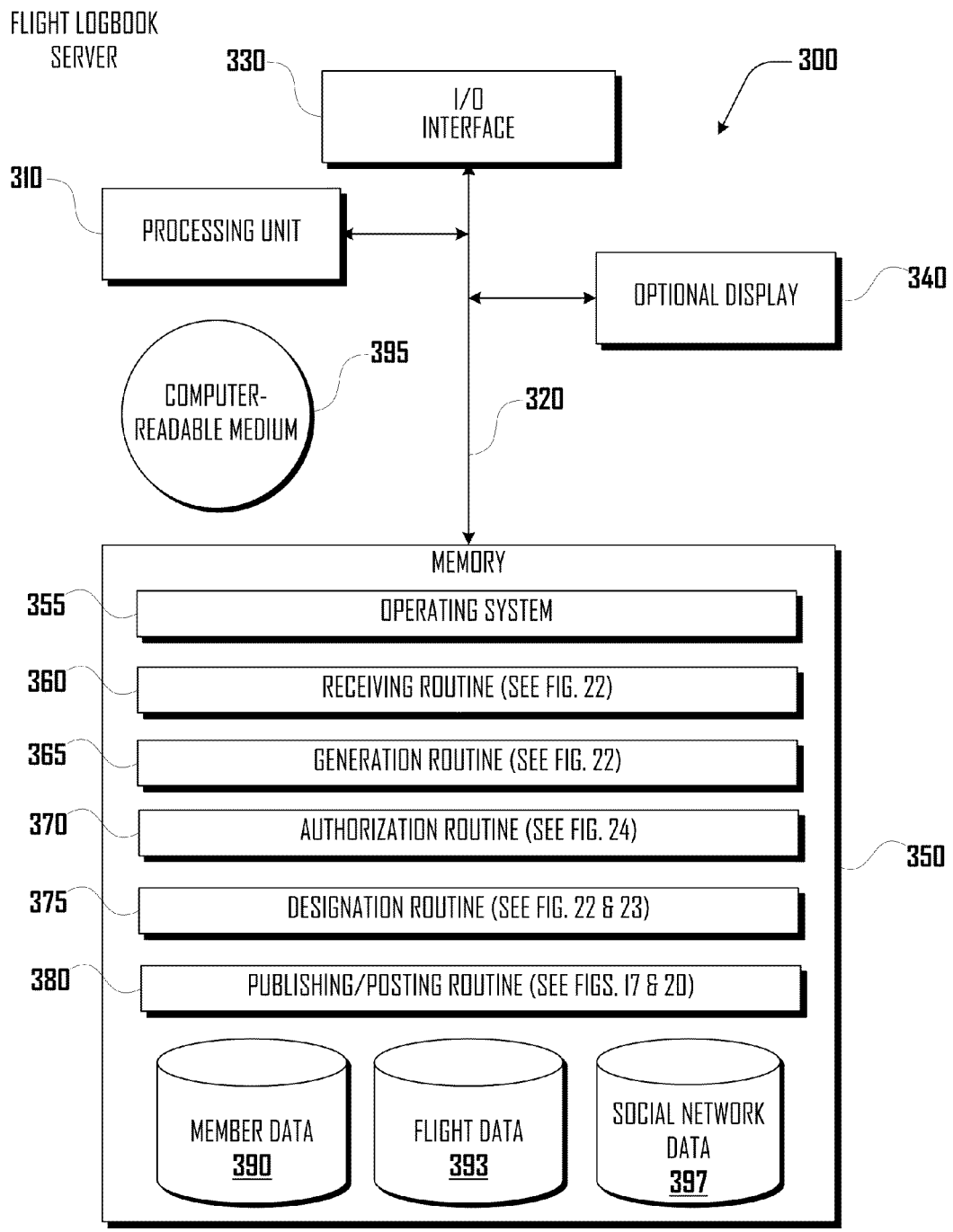
FIG. 3 illustrates several components of a flight server in accordance with one embodiment.

Referring now to FIG. 3, several components of a flight logbook server 300 are shown in accordance with one embodiment. In some embodiments, the flight logbook server 300 may include many more components than those shown in FIG. 3. However, it is not necessary that all of these generally conventional components be shown in order to disclose an illustrative embodiment. As shown in FIG. 3, the flight logbook server 300 includes an I/O communication interface 330 for connecting to the communications network 110.

The flight logbook server 300 also includes a processing unit 310, a memory 350, and an optional display interface 340, all interconnected along with the I/O communication interface 330 via a communication bus 320. The memory 350 generally comprises a random access memory ("RAM"), a read only memory ("ROM"), and a permanent mass storage device, such as a disk drive, flash device, or the like. The memory 350 stores program code for a number of applications, which includes executable instructions for receiving routine 360 (see FIG. 22, discussed below), generation routine 365 (see FIG. 22, discussed below), authorization routine 370 (see FIG. 24, discussed below), designation routine 375 (see FIGS. 22 and 23, discussed below), and publishing/posting routine 380 (see FIGS. 17 and 20, discussed below). In addition, the memory 350 also stores an operating system 355, member data 390, flight data 393, and social network data 397. These software components may be loaded from a computer readable storage medium 395 into memory 350 of the flight logbook server 300 using a read mechanism (not shown) associated with a non-transient computer readable storage medium 395, such as a floppy disc, tape, DVD/CD-ROM drive, memory card, or the like. In some embodiments, software components may also be loaded via the I/O communication interface 330, rather than via a computer readable storage medium 395.

As previously indicated, the member data 373 and social network data 397 may include account and connection information associated with different active social media platforms that may be used to designate where the flight information will be shared, such as Facebook®, Twitter®, RSS, YouTube®, Yahoo®, LinkedIn, StumbleUpon, Delicious, Technorati, Digg, Reddit, Furl, and Flickr. Other social media platforms provide a variety of acceptable alternate and/or equivalent implementations and are not considered beyond the scope of this disclosure. Examples of additional social networks that might be configured to work with the mobile flight logbook system include Google+, Orkut, Habbo, Blogster, Tumblr, Plaxo, Badoo, hi5, Bebo, Ibibo, douban, Flixster, Foursquare, Friendster, Kiwibox, Mixi, Taringa, Myspace, Netlog, Open Diary, Qzone, Renren, Tagged, Vkontakte, Windows Live Spaces, WiserEarth, Xanga, and the like.

Although a flight logbook server 300 has been described that generally conforms to conventional general purpose computing devices, the flight logbook server 300 may be any of a great number of network devices capable of communicating with the communications network 110 and obtaining applications, for example, mainframes, minicomputers, workstations, personal computers, or any other suitable computing device. In some embodiments, some or all of the systems and methods disclosed herein may also be applicable to distributed network devices, such as cloud computing, and the like. Available cloud resources may include applications, processing units, databases, and file services. In this manner, the flight logbook server 300 enables convenient, on-demand network access to a shared pool of configurable mobile flight logbooks, including pilot authentication, flight/social network monitoring and aircraft tracking related computing services and resources (e.g., networks, servers, storage, applications, and services) that can be rapidly provisioned and released with minimal management effort or service provider interaction. These services may be configured so that any computer connected to the communications network 110 is potentially connected to the group of mobile flight logbook applications, processing units, databases, and files or at the very least is able to submit/access flight information. In this manner, the flight data maintained by flight logbook server 300 may be accessible in a variety of ways by a variety of client devices, such as user access point 120 and the guest device 130, for example, a personal computer, a handheld computer, a cell phone, a personal media console, a personal game console, or any other device that is capable of accessing the communications network 110.

Figure 4:
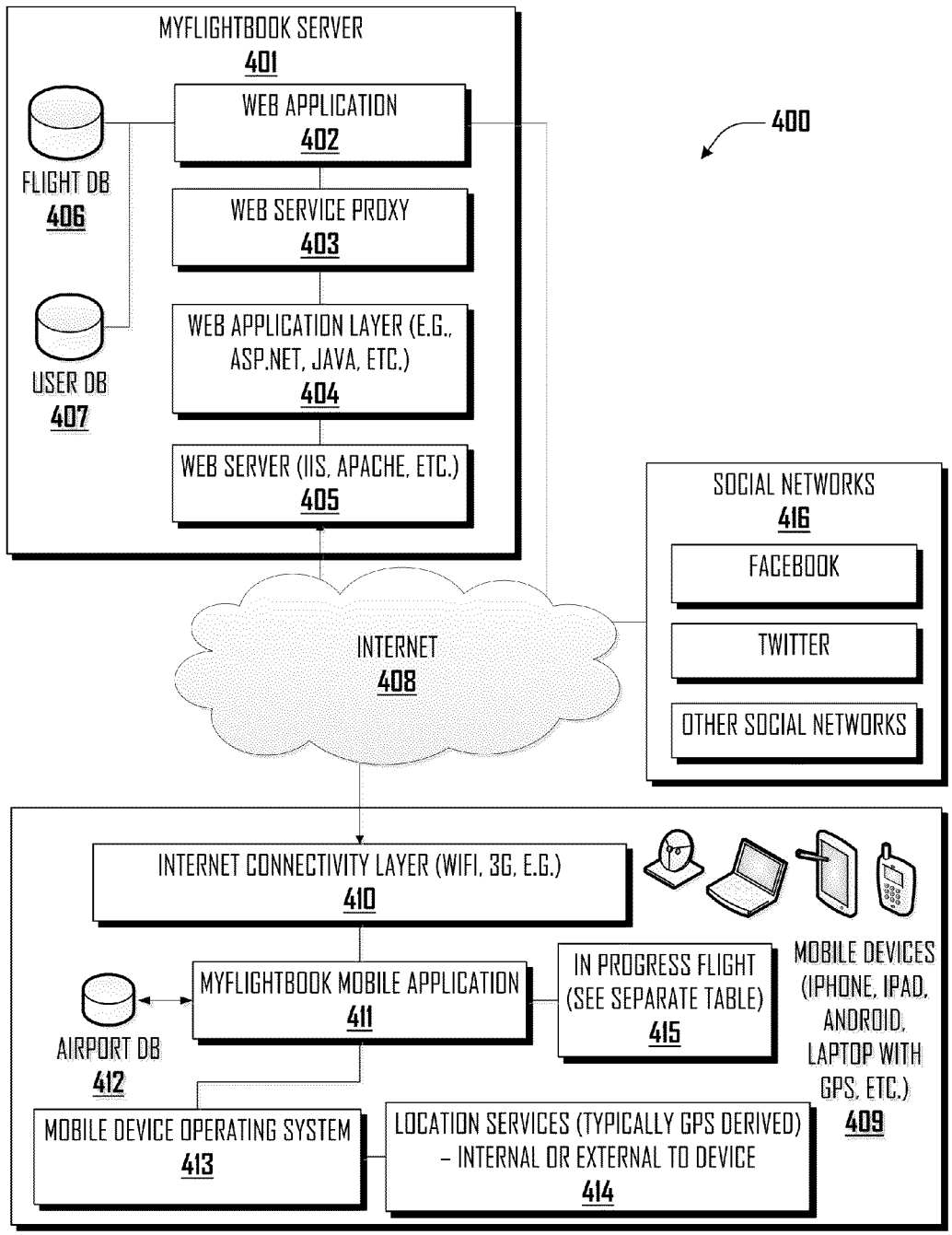
FIG. 4 illustrates system architecture for the mobile flight logbook system in accordance with one embodiment.

Referring now to FIG. 4, system architecture for the mobile flight logbook system 400 is shown in accordance with one embodiment. There are four main pieces in the mobile flight logbook system 400: the Flight logbook server 401, the mobile device 409, the Internet 408, and Social Networks

416, such as Facebook, Twitter, Google+, Orkut, etc. In one embodiment, the primary component of the flight logbook server is a web application 402, which performs the functions of authenticating users and storing and retrieving flight data on behalf of those users. Each flight is stored in a database of flights 406 and is associated with a unique user from a database of users 407. The web application provides a web service proxy 403, which listens for and responds to web service requests. In the preferred embodiment, this is done using SOAP and XML, but other web service methodologies such as JSON/REST could work equally well. The web service and web application both rely on a web application layer 404 such as ASP.NET, Java, Ruby on Rails, etc., which in turn relies on an underlying web server 405 such as Microsoft IIS, Apache, etc., for more general purpose web support, as is well established in the industry.

The mobile device 409 is any sort of computing device that has access to its own location and Internet communication capabilities. This could be a modern smartphone, such as an iPhone or Android phone, a tablet such as the iPad, or even a laptop computer with GPS functionality and a WiFi or 3G connection.

The Mobile Application 411 runs on the mobile device, communicating over the Internet by the device's built-in Internet connectivity layer 410 and using the device's operating system 413 and location services 414 to determine it's position and for the other standard application support (such as displaying information to the user on the screen or responding to user interactions). The application has access to a database of airports 412 so that it can quickly look up the airport nearest to its position even when there is no network connectivity available, and it also keeps track of the information about the current flight in progress 415 so that it can build up the flight information as it learns more about it from the location services.

When a flight is complete and ready to be stored, the mobile application 411 authenticates the user with the web application 402, if it has not already done so. This is done via well-established techniques, in which the user's credentials are provided to the server via the web service proxy 403 using a secure connection over the Internet 408. The web application 402 then looks up the user in the user database 407 and validates the credentials against what is found in that database.

The application then submits the flight to the web application 402, which stores a record of the flight in the flight database 406. If the request to submit the flight indicates that the flight should also be posted to one or more social networking sites, then for each requested site the web application 402 looks up an authorization token in the user database 407 and, if one is found, submits a link to the flight over the Internet 408 to the appropriate social networking site 416.

Figure 5:
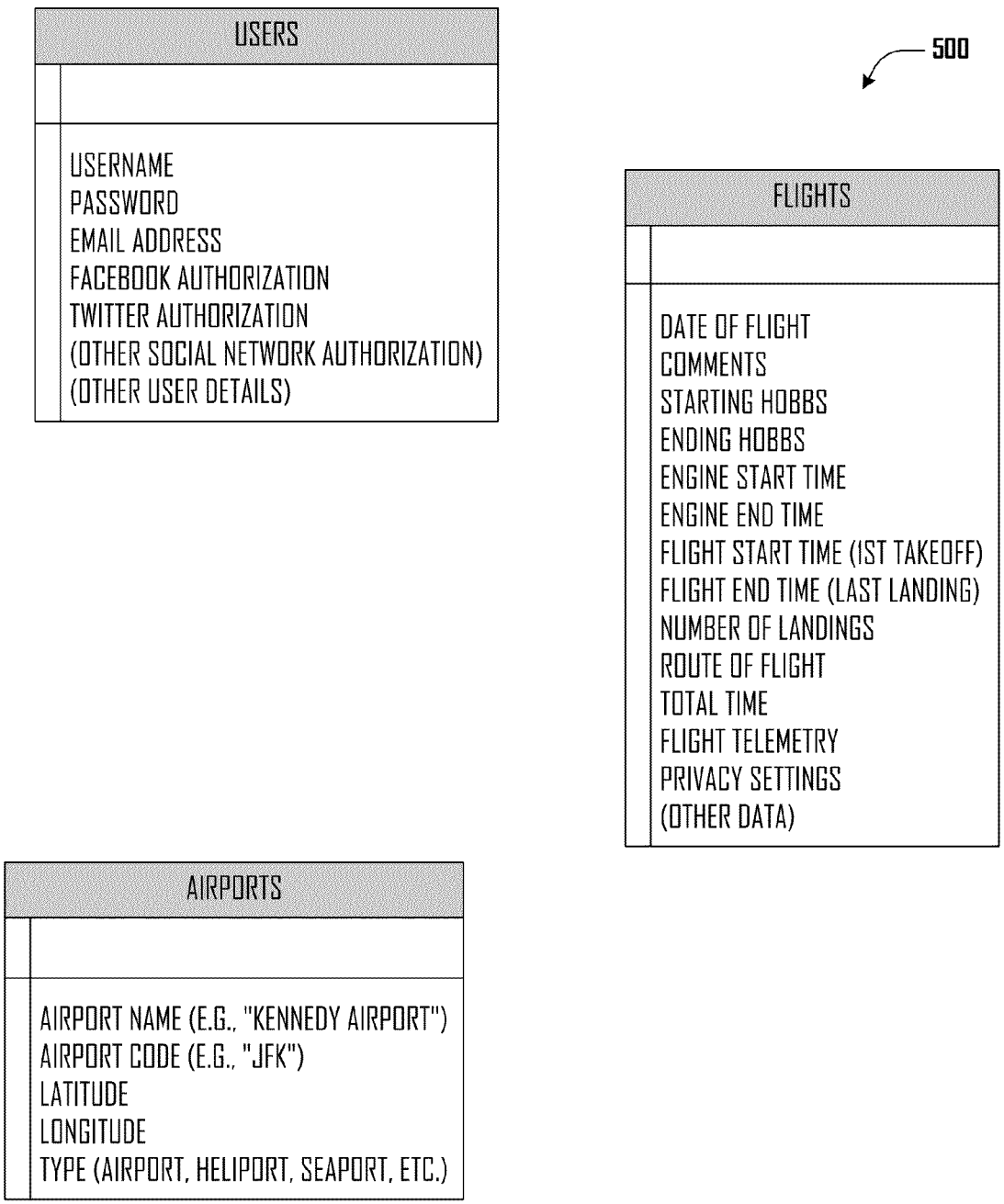
FIG. 5 illustrates several data structures for use with the mobile flight logbook system in accordance with one embodiment.

Referring now to FIG. 5, data structures 500 for data stored in various system databases are shown in accordance with one embodiment. The illustrated data structures include Users for data stored in the User database, Flights for data stored in the Flight database, and Airports for data stored in the Airports database.

The User data structure includes Username, Password, Email address, Facebook Authorization token, Twitter Authorization token, Additional authorization tokens. In one embodiment, the Username represents a unique, unchanging name for the user. In one embodiment, the Password represents a security credential for a user. A user can be authenticated by a username/password pair or an email address/password pair. The password is one-way encrypted for security; when a password is provided by a user, it is also encrypted and the two encrypted passwords are compared. In one embodiment the Email address represents the user's email address and a point of contact. In one embodiment, the Facebook Authorization token is a unique string of text defined by and provided by Facebook that is passed to Facebook along with requests to post flight information on behalf of the specific user in order to authorize the web application to post on the user's behalf. Likewise, the Twitter Authorization token is issued by Twitter and is analogous to the one provided by Facebook. Additional authorization tokens may be required for additional social networks, such as Google+ or others.

The Flights data structure includes Date of flight, Comments, Starting/Ending Hobbs timer, Engine Start/End Time, Flight Start/End Time, Number of Landings, Route of flight, Total Time, and Flight Telemetry. In one embodiment, Date of flight represents the date for the flight, typically local time of the start of the flight. In one embodiment, Comments represent any pilot-created description of the flight. In one embodiment, Starting/Ending Hobbs time represent the starting time and ending time of the Hobbs meter, which is a timer in an airplane which records the time of the airplane's use (could be time that the engine is running or time that the aircraft is airborne). In one embodiment, Engine Start/End Time represents the times, in UTC (rather than the pilot's local time zone), that the engine is started and stopped. In one embodiment, Flight Start/End Time represent the times, in UTC of the first take-off and of the last landing of the flight. In one embodiment, Number of Landings represent the number of landings in the flight. Typically, Pilots don't bother to record the number of takeoffs for the simple reason that the takeoff count always, by the end of the flight, equals the landing count. In one embodiment, Route of flight represents a sequence of airport codes that describe the route of the flight. E.g., "SEA BOS LHR" would mean Seattle to Boston to London. In one embodiment, Total Time represents the total time that is recorded for the flight; when a pilot says that they have a given number of hours of flight experience, it is based on this time. This is typically the time from engine start to engine shutdown, but pilots may choose for this to be exclusively airborne time (i.e., exclusive of taxi and idle time). In one embodiment, Flight Telemetry represents a text-based table of flight data, expressed as a series of rows and columns. The format of this is fairly arbitrary, but if it includes a column of timestamps, latitudes, and longitudes, then the path of the flight can be reconstructed from this.

The Airports data structure includes Airport Name, Airport Code, Latitude, Longitude, and Type. In one embodiment, Airport Name, represents the English language name of the airport (such as "Kennedy Airport"). In one embodiment, Airport Code represents the IATA or ICAO 3- or 4-letter acronym for the airport (such as "JFK" for Kennedy Airport). In one embodiment, Latitude represents a decimal number representing the latitude of the airport. In one embodiment, Longitude represents a decimal number representing the longitude of the airport. In one embodiment, Type represents a code that distinguishes the type airport (e.g., airports from seaports from heliports). This can also distinguish airports from other radio navigational aids that are used to describe routes of flight.

Figure 6:
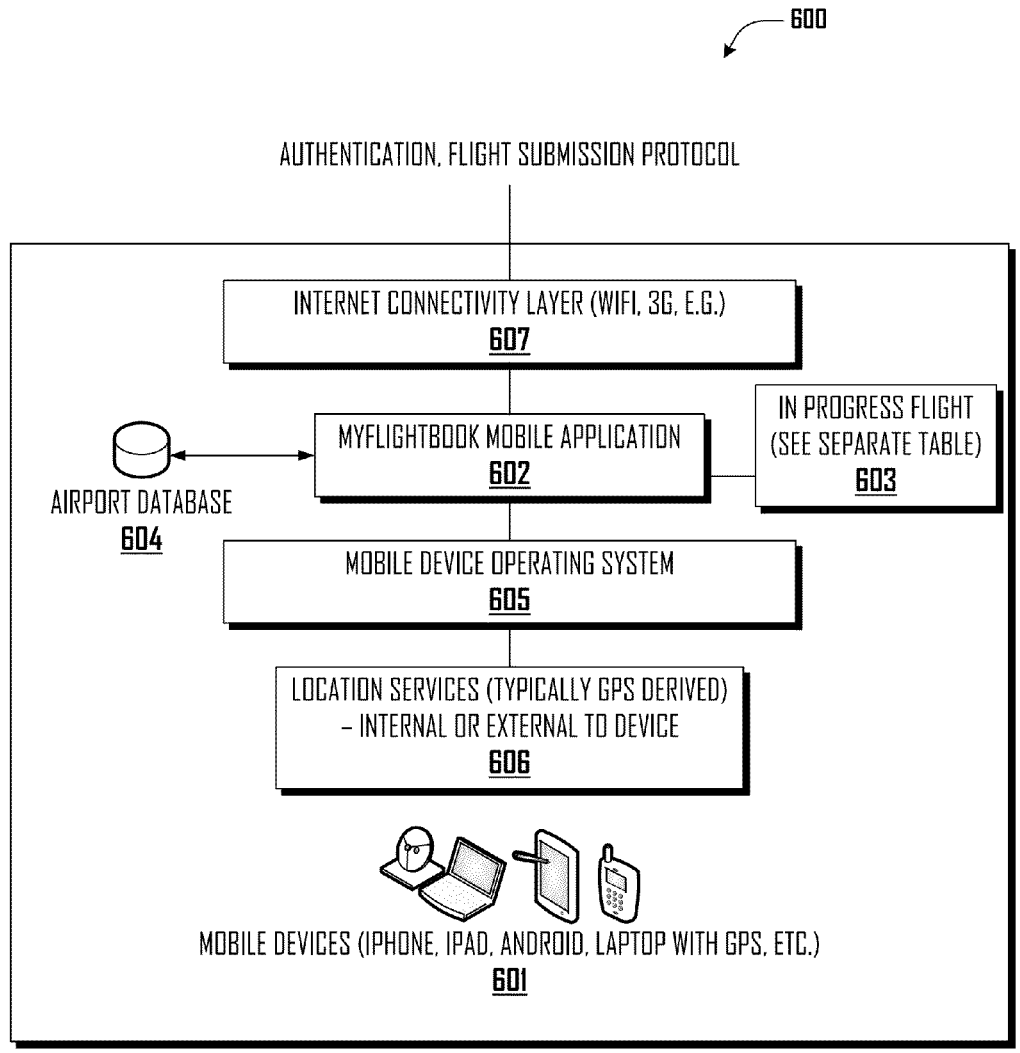
FIG. 6 illustrates a mobile portion of the flight log book system in accordance with one embodiment.

Referring now to FIG. 6, a mobile device portion 601 of the flight log book system is shown in accordance with one embodiment. The mobile device 601 is any sort of computing device that has access to its own location and Internet communication capabilities. This could be a modern smartphone, such as an iPhone or Android phone, a tablet such as the iPad, or even a laptop computer with GPS functionality and a WiFi or 3G connection.

The mobile application 602 of FIG. 6 runs on the mobile device, communicating over the Internet by the device's built-in Internet connectivity layer 607 and using the device's operating system 605 and location services 606 to determine it's position and for the other standard application support (such as displaying information to the user on the screen or responding to user interactions). The application has access to a database 604 of airports so that it can quickly look up the airport nearest to its position even when there is no network connectivity available, and it also keeps track of the information about the current flight in progress 603 so that it can build up the flight information as it learns more about it from the location services.

In one embodiment, the mobile device may be any sort of popular portable device, such as a mobile phone (iPhone, Android, Windows 7 phone, and so forth), tablet (such as an iPad or various Android devices), laptop, or any other mobile device that is capable of:

1. Running 3rd party applications (i.e., that can be downloaded onto the device by the owner);
2. Determining its location, either through built-in mechanisms or through externally connected GPS devices, and passing that information along to applications; and
3. Connecting to the Internet. This connection need not be persistent, nor is any particular connection mode (wireless, wired, WiFi, 3G, etc.) necessary.

In one embodiment, the location information includes Latitude and Longitude. Although in another embodiment, the location information will also include speed, altitude, timestamp, and an estimate of quality (typically expressed as a radius of position uncertainty). If the speed is not provided, it can often easily be computed by dividing the distance between the latitude/longitude coordinate of a position report and that of the previous received position by the elapsed time between the two position reports. Location information is typically provided by the operating system, but could as easily be provided by an external location-sensing device such as a portable GPS or a navigation system built into the aircraft.

In one embodiment, it is considered unimportant whether the location data is "push" or "pull". That is, it does not matter if the device notifies the system when it moves to a new position ("push"), or if the system polls the device to determine the current position and makes its own determination of movement ("pull.")

During a flight, the mobile device running the application works autonomously, using location information to gather information about the flight and to pre-fill flight data on behalf of the user. A database of airports is included as part of the application so that it can determine the nearest airport when a take-off or landing is detected.

At some point after the flight is complete and the user wishes to add the flight to their logbook, they can submit the flight. At this point, if there is no Internet connection available, the flight can be queued for later; if there is a connection, the flight can be submitted immediately.

The application submits the flight to the server using well-established Internet protocols, such as SOAP, which provides a mechanism to pass data between two computers on the Internet using XML to represent the data and HTTP to transport the data). The server has a Web Server layer (such as Apache or Microsoft's IIS), which receives the data, an Application layer (such as ASP.NET, Java, or Ruby on Rails), which provides a framework for the web application, and the web application itself which processes the data. In the simple case of the submission of a flight, the processing steps consist of (a) validating the data and if it is valid, (b) storing it in a database on the server, and (c) posting information about the flight to one or more social networking sites (as described below).

In the present invention, the web application provides a "Web Service", which is designed to service data requests from other authenticated computers (as opposed to servicing requests for web pages from people). Web services using protocols such as SOAP are also well established and standardized (and SOAP is, in fact, used in the preferred embodiment here, but any other web service standard such as JSON/REST could also be used).

The Web application receives the request to submit the flight, stores it into the database, and then optionally (depending on the user's request and their account configuration) generates a "predictive link", which is a web address ("URL") that will allow others to view the flight's data, and pushes this link to the requested social networks using the protocols and methods that are publicly defined by those services.

Figure 7A:
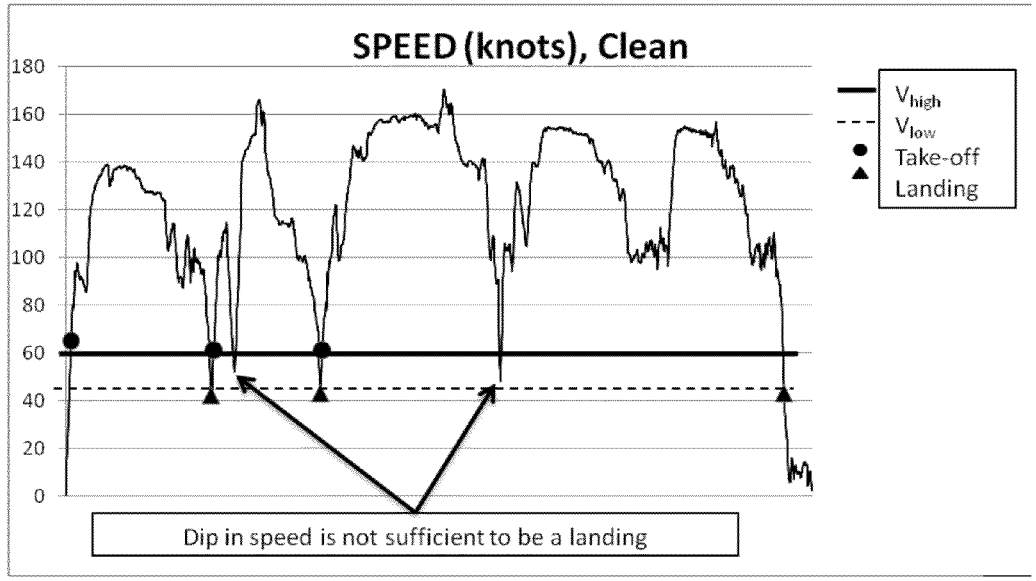
FIG. 7A illustrates flight speed data after being cleaned (filtered) and FIG. 7B illustrates raw data collected in accordance with various embodiments.
Figure 7B:
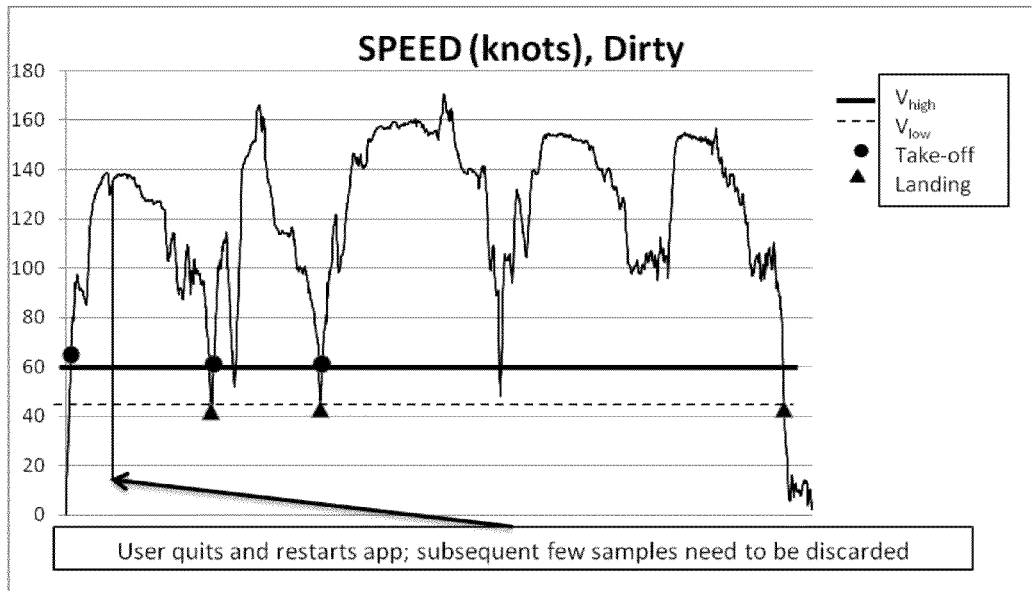

Referring now to FIG. 7A and FIG. 7B, flight speed data collected at a clean location and at a dirty location are shown respectively in accordance with various embodiments. Take-off and landing detection is done by reference to the speed as indicated by the GPS in the mobile device. One such technique is described here. At the highest level, the technique is very simple: a high speed indicates flight, and a low speed indicates that the airplane is taxiing (or stationary) on the ground. In practice, at least two speed thresholds are necessary, a high-speed ($V_{high}$) and low-speed ($V_{low}$). The flight starts in the "not flying" state and transitions to the flying state when the speed is observed to exceed the higher threshold speed $V_{high}$. Similarly, the flight state transitions to "not flying" when it crosses the lower speed $V_{low}$ from above. A landing is recorded on a flying to not-flying transition, and a takeoff is recorded on a not-flying to flying transition.

The use of two threshold speeds rather than one provides hysteresis and may be used as a technique for "debouncing" input data streams. For example, if a single speed were used to distinguish flying from ground operations, a given airplane could have momentary fluctuations around that speed all while airborne or on the ground, causing the system to incorrectly infer takeoff or landing events that didn't occur. The use of two speeds helps with this. The hysteresis, however, is not sufficient to have good detection of takeoffs or landings, as demonstrated in FIGS. 7A and 7B.

The specific values used for these speeds are not terribly important, the main requirement is that they are separated by more than a few knots (for "debouncing", described below) and that they more or less divide typical flying speeds from typical taxiing speeds for most aircraft. In one embodiment, 40 kts and 55 kts are used, but these can be tuned for better detection for a given aircraft.

Because the device's position reports have errors (particularly in the speed parameter right after the GPS services are initiated) and the timing of updates is non-deterministic, additional filters are necessary to weed out reduce the incidence of false-positives of takeoffs or landings. Among these filters are: discarding any samples with a speed of 0 (or negative!), discarding any samples with a large estimated position error component, discarding any sample that with a time stamp that is earlier than the latest recorded sample (i.e., out of order), discarding any sample that has a timestamp too closely spaced to the previously recorded sample, discarding the first N samples received after initialization of location services (because the speed reported in these samples often takes several samples to settle in on an accurate value). On some devices, N is 3, other devices do better and have N=0. In practice, different devices have different sorts of position error, so the particular filters that need to be used vary from device to device. For example, the specific list of filters above applies to the iPhone; while Android devices required only a subset of these.

Figure 8:
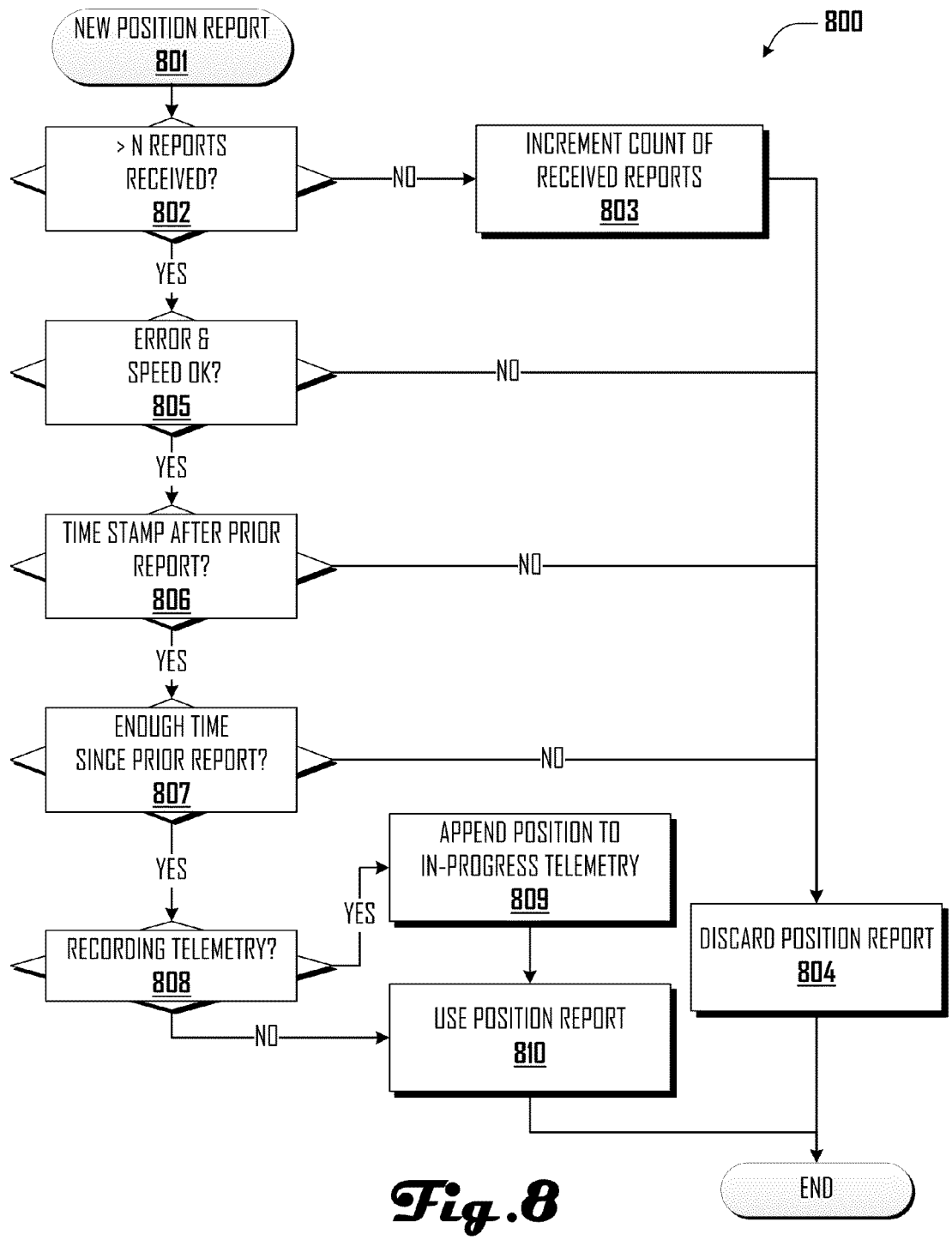
FIG. 8 illustrates a flow diagram of a portion of a location detection routine used to clean dirty data for the location-aware mobile device shown in FIG. 2 in accordance with one embodiment.

Referring now to FIG. 8, a flow diagram is shown of a portion 800 of a location detection routine 260 for the location-aware mobile device in FIG. 2 in accordance with one embodiment. The illustrated portion 800 of the location detection routine 260 may be used to clean incoming data as described below.

When a new position report is received 801, the number of received position reports is checked 802. If a threshold number N of position reports (as best determined for an individual device) has not been received, then the count of received reports is incremented 803 and the position report is discarded 804. Next, the speed and estimated error (typically reported by a GPS system) in the report are checked to see if they are within acceptable ranges 805. If not, the sample is discarded. The timestamp, if present, is then checked 806. If the timestamp indicates that the report is out of sequential order, it is discarded. Similarly, if the timestamp for the position report is too close in time to the previously received timestamp 807, it is discarded. At this point, the sample is good. If telemetry is being recorded 808, the position report is appended to the in-progress list of position reports 809. The position report is then used 810 by the system (e.g., as described below in FIGS. 10B and 10C).

Engine start/stop times are used to determine when to autodetect and record telemetry data. In other words, the system has an "engine running" and an "engine stopped" state. If the time of engine start is known and the time of engine stop is not known, the flight is in an "engine running state". If the engine stop time is known, it is in an engine-stopped state. Engine start and stop times must be indicated by the user, and can be done by a single tap: if the time is unknown, then tapping a button sets it to the current time. If the time is a known time, then tapping the button allows the user to either edit the time or to erase it (i.e., make it unknown again). While the system provides location updates (including time stamp, latitude/longitude, speed, estimated error, and potentially additional data as well) while the application is running, this data is only used while in the "Engine Running" state. If the engine is running, the application looks for takeoffs and landings, and records flight telemetry based on received location updates. When the engine is shut down, the system assumes that the airplane is parked and stops recording telemetry or looking for takeoffs/landings. Of course, the notion of "engine start" and "engine stop" do not require that an engine actually be used. For example, a glider pilot can simply use these concepts to turn on and off the start of the flying experience.

Pilots typically record their route of flight in a de-duped manner. For example, if they fly from San Francisco to Portland, do several landings at Portland and then continue to Seattle, they would record this as SFO-PDX-SEA (and record the appropriate count of landings) rather than as SFO-PDX-PDX-SEA. In the present invention, there are several scenarios where it is desirable to append the code for the nearest airport in a de-duped manner: at engine start (typically noting the initial airport), upon take-off or landing, at engine stop, or when the pilot explicitly requests it (e.g., hitting a "nearest" button). As a practical matter, it is sufficient to append the nearest airport code at engine start, upon landing, or upon pilot request. The algorithm for appending is fairly straightforward: the airport nearest to the most recently received position report is looked up in the application's database. This is a straightforward database query, sorted by distance. The code for that airport is appended to the route in progress if the route in progress does not already end with the airport's code. For example, if the airport code is "XYZ", then it is appended only if the current text of the route does not end with "XYZ".

In one embodiment, an additional check may be done when looking up the nearest airport: helicopters and seaplanes have a much wider range of potential airports that could be consider "nearest" than an airplane with wheels does, and seaports and heliports are often co-located or very near airports. As a result, depending on user preference (or, if known, the type of aircraft being flown), it may be preferable, if possible, to exclude seaports and heliports as part of the airport lookup.

Figure 9:
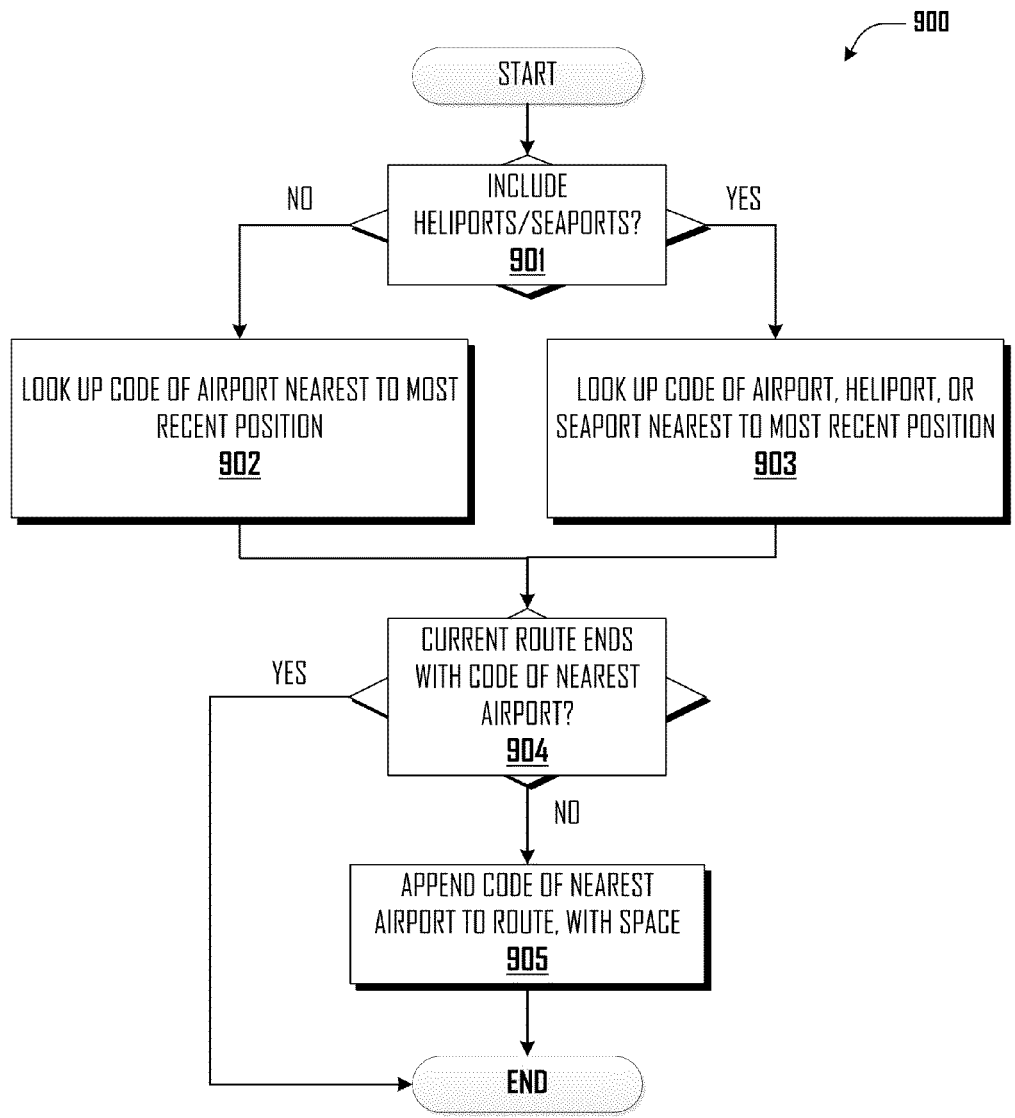
FIG. 9 illustrates a flow diagram of a portion of a location detection routine used to append airport data for nearest airport by the location-aware mobile device shown in FIG. 2 in accordance with one embodiment.

Referring now to FIG. 9, a flow diagram is illustrated of a portion 900 of a routine used to append airport data for the nearest airport by the location-aware mobile device 200 shown in FIG. 2 in accordance with one embodiment. The user option to include heliports or seaports is first checked 901. If these are to be included, then the nearest airport/heliport/seaport to the user's position is retrieved from the airport database 903; otherwise, the nearest airport is used 902, excluding heliports and seaports. The 3- or 4-letter code of the retrieved facility is then compared against the last 3- or 4-characters of the route of flight (exclusive of any whitespace) as known thus far 904. If there is not a match, then the airport code is appended 905. For example, if the nearest airport is "SEA" (SeaTac airport in Seattle) and the route so far is "SFO SEA", then the nearest airport is not appended, but if it is "SFO" then "SEA" will be appended (with a space) to yield "SFO SEA"

Figure 10A:
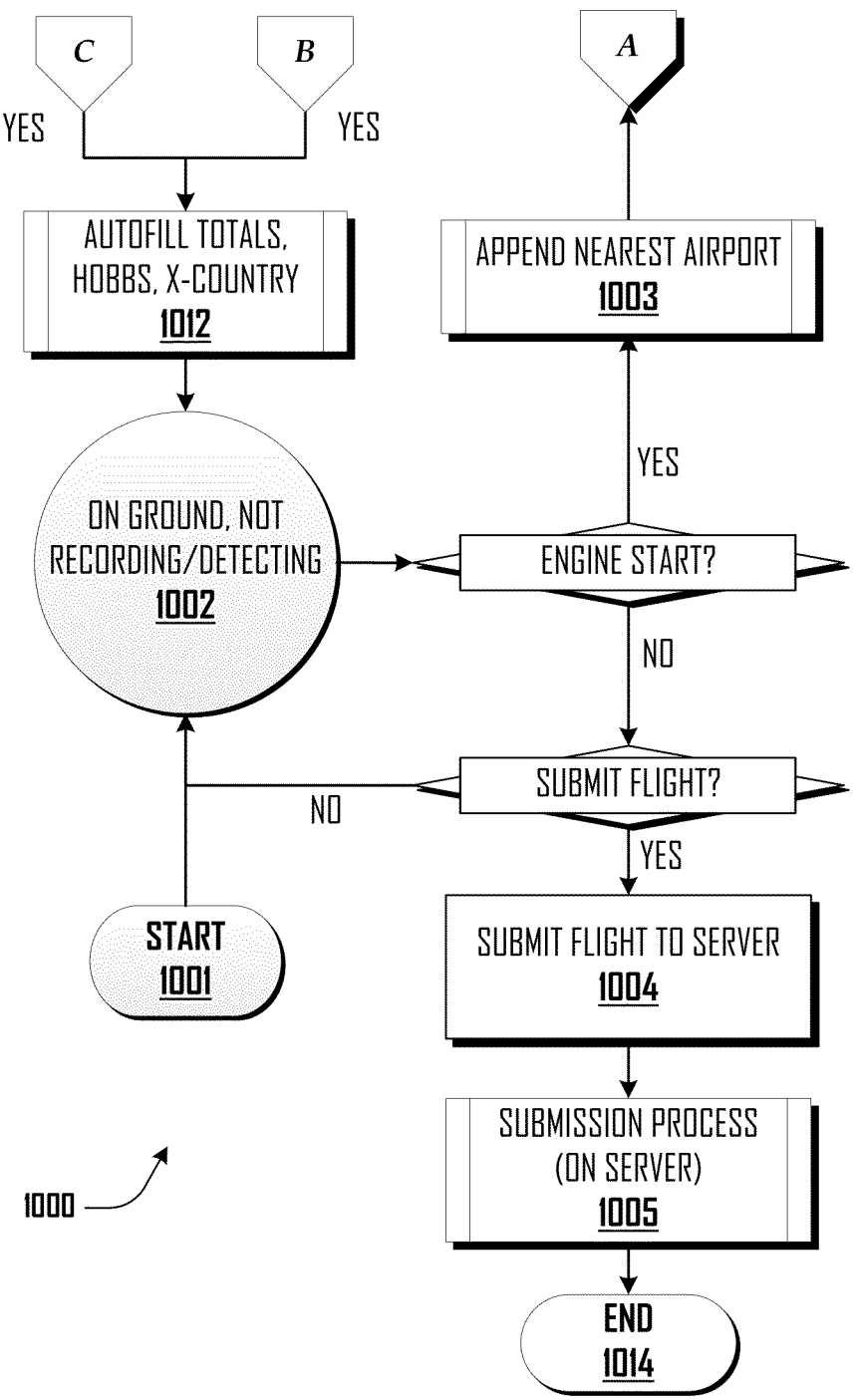
FIG. 10A-C illustrates a flow diagram of a portion of a flight monitor routine used to populate a flight record with location information by the location-aware mobile device shown in FIG. 2 in accordance with one embodiment.
Figure 10B:
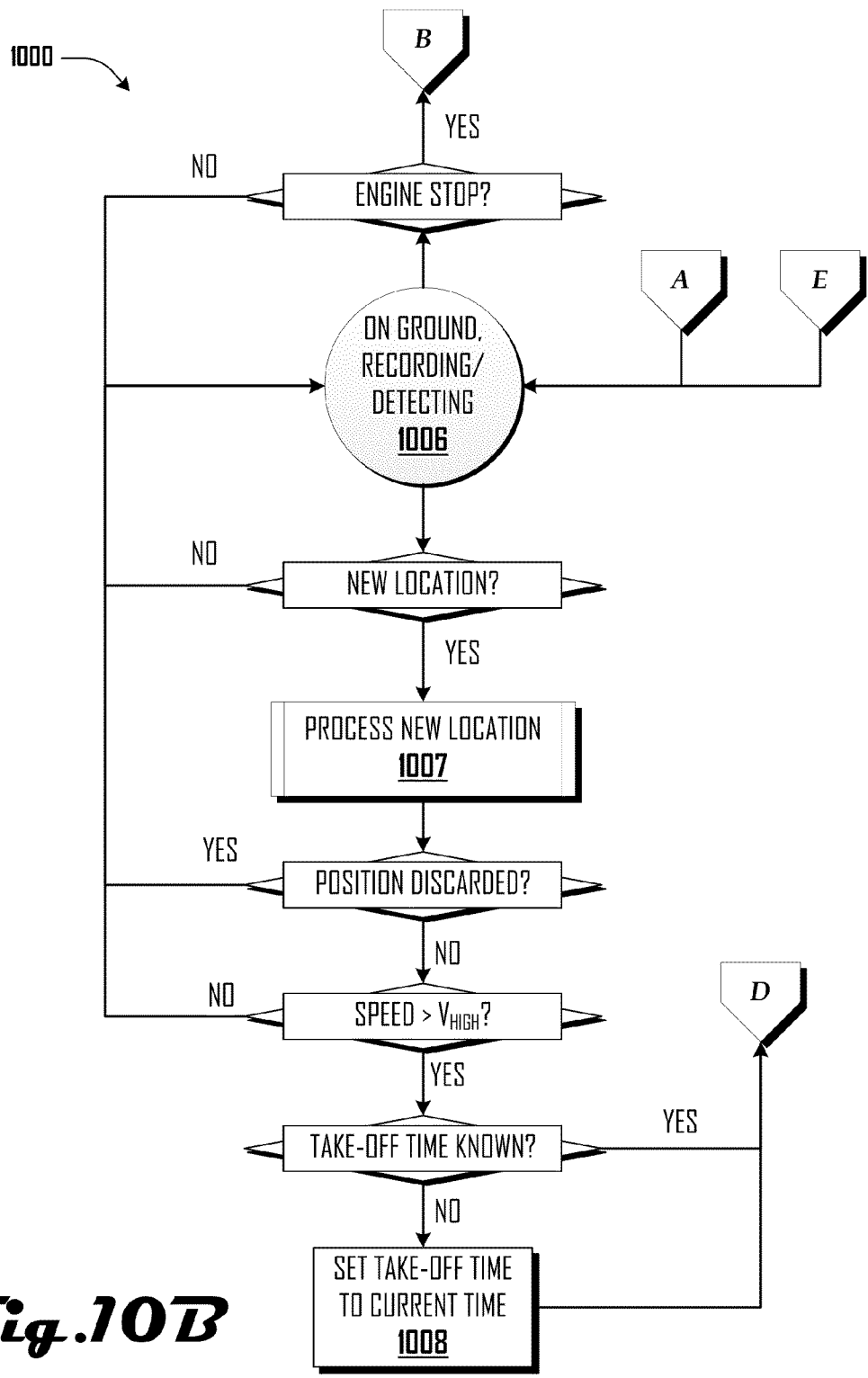
Figure 10C:
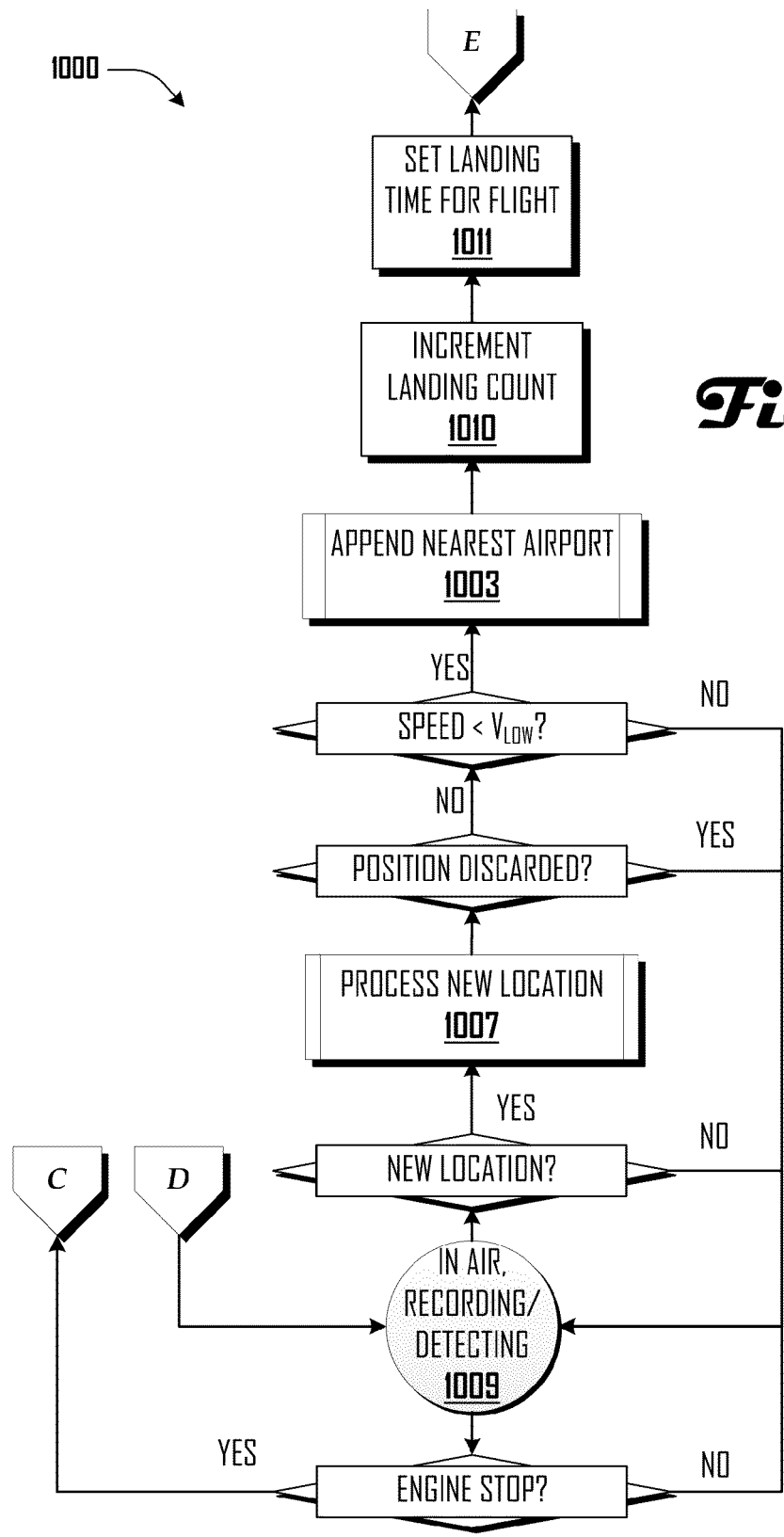

Referring to now to FIG. 10, a flow diagram is illustrated of a portion 1000 of a flight monitor routine 270 that is used to populate a flight record with location information by the location-aware mobile device shown in FIG. 2 in accordance with one embodiment. In FIG. 10, a new flight record begins in a state where it is on the ground, not recording flight information, and not detecting takeoff or landing events 1002. When an engine time is entered, this is treated as an Engine Start event, and the nearest airport is auto-appended 1003 to the existing route of flight, as described above in FIG. 9, since it is assumed that the airplane is already at an airport when the engine is started. At this point, the engine start time is known and the engine stop time is not known, and so the system moves into state (1006), in which the airplane is assumed to be on the ground, and the system is recording telemetry data and is detecting takeoff events. As new location events are received, they are processed (1007, described above in FIG. 8). If the position is retained and the speed is above Vhigh, a take-off event is recorded. The flight now moves to state (1009), where it is in the air, recording telemetry and detecting landing events. Before moving to state (1009), however, the take-off time for the flight it is set to the current time in UTC (1008) if it is not already known. This is done conditionally so that only the time of the first takeoff is recorded. (Flying time can be computed as the time from the first take-off to the last landing, so that touch-and-go-landings in the middle of the flight will not erroneously shorten the computed flight time). Once the flight is in state (1009), the aircraft is in the air, and the location-aware mobile device is recording telemetry and detecting landing events. The process in state (1009) is the mirror of state (1006), in that it processes events in the analogous way and watches for landing events (this time looking for a speed less than $V_{low}$). When landing event is detected, 3 things happen before returning to state (1006): the nearest airport is appended via process (1003), the count of landings is incremented by one (1010), and the landing time is updated to the current time in UTC (1011), even if a previous landing time was known, since the time of the last landing time is what is desired. At any point, the engine stop time may be filled in, which is interpreted as an engine stop event. This causes the system to move back to state (1002), but since this is treated as a final step before the completion and submission of the flight (most flights, after all, do not last long after the source of thrust is removed), hobbs, total time, and cross-country time are auto-filled (1012) at this point before returning to state (1002). The auto-fill process (1012) is described in more detail below in FIGS. 13, 14, and 15. From state (1002), the process can begin again, or the pilot can submit the existing flight from the device (1004) to the server, where it is processed (1005), which is described below.

Figure 11:
FIG. 11 illustrates a screenshot of a portion of a flight record of a flight in accordance with one embodiment.

Referring now to FIG. 11, a screenshot 1100 is shown of the portion 1000 used to populate a flight record with location information of the flight monitoring routine 270 in accordance with one embodiment. This screenshot represents just one possible embodiment of the invention. For example, many additional details about a flight could be captured, or the screen could be laid out differently to better fit a given device. This is meant merely to illustrate one way that a pilot could interact with the flight monitoring routine 270 of the invention. As shown, the starting hobbs time of 2.3 was recorded by the user, as was the starting engine time (expressed, per flying conventions, in UTC "Zulu" time, also referred to as Greenwich Mean Time). As shown, a flight was conducted from San Francisco to Los Angeles on the evening of Aug. 5, 2010. (Because the Pacific time zone is 7 hours behind UTC in the summer months, the engine start time actually displays as being in the morning of August 6). The pilot entered the time of engine start (2:11 am UTC), which alerted the device to start looking for a take-off event. The device was then able to detect the time of the first take-off (2:20 am, UTC, automatically recorded as "Flight start") and the final landing at 5:15 am UTC (10:15 pm the prior night in California), which is recorded as "Flight End". With the engine shutdown at 5:23 Z, a total of 3 hours and 12 minutes (3.2 hours) have elapsed between engine start and engine stop, and in this case the pilot is recording total engine time as their loggable time and as their time for the hobbs meter, so the ending hobbs is filled in with a value that is 3.2 greater than the starting value (2.3+3.2=5.5), and the total time to log for the flight is also updated to be the engine time of 3.2 hours. The starting airport (SFO, aka San Francisco International) airport was filled in by the system at the time of engine start because it was the closest airport to the user at that time. The pilot made touch-and-go landings on the way at San Jose (SJC), Santa Barbara (SBA), and Santa Monica (SMO) before the final landing at Los Angeles (LAX). The device was able to recognize each touch-and-go as a landing, and thus the count of landings increased as the flight progressed from 0 to 4 landings, updating both the count of landings and the route of flight as each landing occurred. When the total time to log for the flight was automatically computed for the pilot, the system looked at the route of flight ("SFO SJC SBA SMO LAX"), decomposed it into its constituent airport codes, and determined that at least one pair of airports were more than 50 nautical miles apart, which is the FAA threshold for logging a flight as a Cross Country flight. As a result, the Cross-country time is filled in as well as the total time. In the lower half of the screenshot 1100 are some of the options that are more important from a social-networking perspective. In this sample embodiment, the pilot can add images using the device's camera by clicking the "Add Image" button. These images will be preserved and stored, and displayed along with the record of the pilot's flight on the server. The pilot in this example can also check whether to share the flight with his friends on Facebook, Twitter, Google+, and the like. In one embodiment of the invention, the available social networks, of course, are not limited to a finite set of social networks; rather depending on market share and technical capabilities of various networks in various markets, access to other social networks could be provided. The pilot in this example can select the level of detail that they wish to display about the flight. In this particular embodiment, the choice is simple and stark: show simply the route of flight, or show a variety of details, but any degree of granularity for these preferences could be specified. For example, the date and tailnumber of the plane could be shared but images could be suppressed. Finally, there is a "Pause" and a "Resume" button at the bottom of the screen so that the pilot can pause/resume the flight (discussed in more detail below). The "Pause" button is disabled in this example because the flight is over and so pausing doesn't make sense, but prior to engine stop one button or the other would be available for the pilot to pause/unpause the flight.

Figure 12:
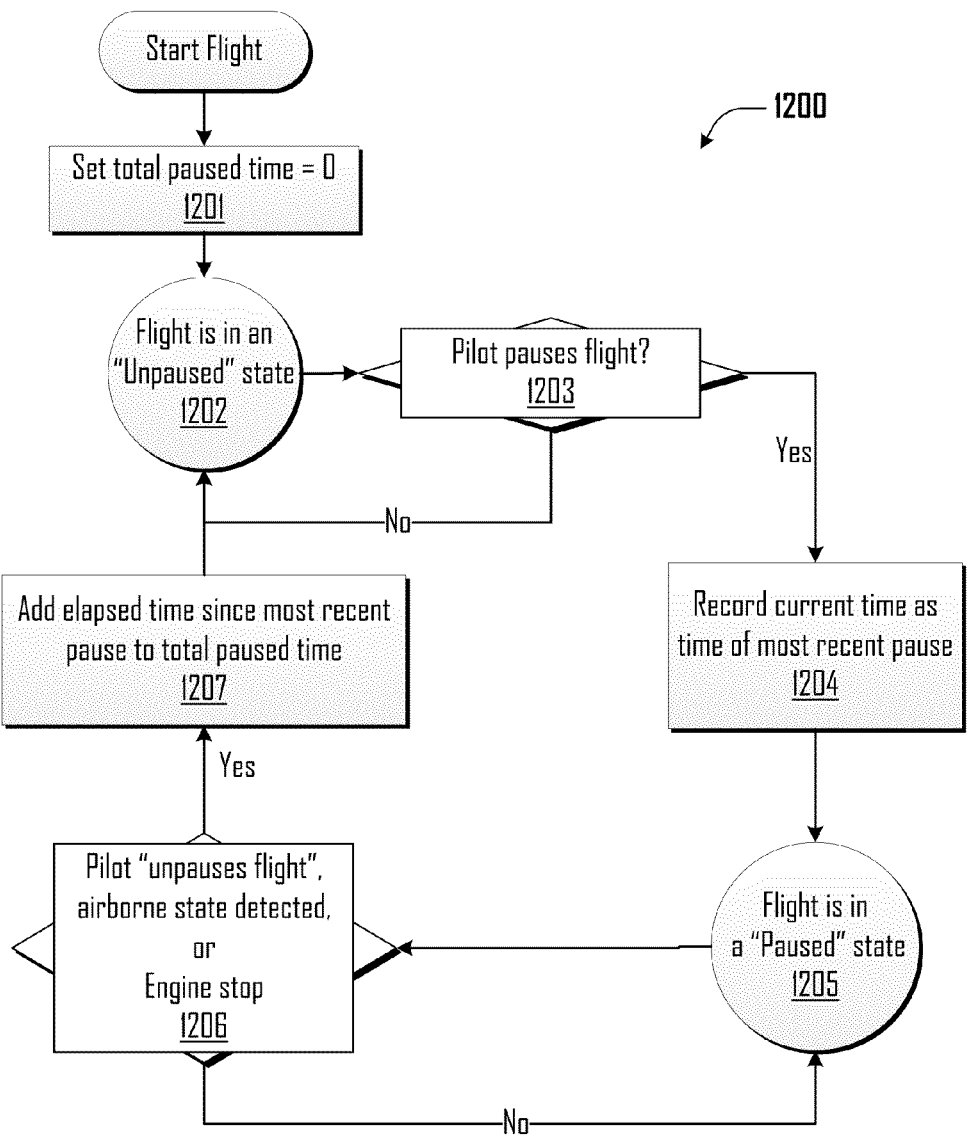
FIG. 12 illustrates a flow diagram of a portion of a flight monitor routine used to pause a flight record by the location-aware mobile device shown in FIG. 2 in accordance with one embodiment.

Referring now to FIG. 12, a flow diagram is shown of a portion 1200 of a flight monitor routine 270 used to pause a flight record, by the location-aware mobile device previously shown in FIG. 2, in accordance with one embodiment. Sometimes it is useful to be able to pause an in-progress flight. For example, if a pilot makes a fuel stop halfway to their destination, then the total engine time will not reflect the correct time to log because it will include the time spent on the ground refueling the airplane. One workaround is, of course, to log two separate flights: one from the origination to the fuel stop and a second from the fuel stop to the ultimate destination. But a better solution is to allow the pilot to "pause" the flight. The idea behind pausing the flight is to add up how much time the in-progress flight is paused, and then subtract that amount from the relevant totals when auto-filling the totals. At the start of the flight, the running total pause time is set to 0 in step 1201 and the flight enters an "unpaused" state 1202. If the pilot pauses the flight 1203, the current time is recorded 1204 and the flight enters a "Paused" state 1205 where it remains until an event occurs to unpause the flight 1206. There are three such events: the pilot explicitly unpauses the flight, the pilot takes off (or the system otherwise determines that it is airborne), or an engine stop time is recorded. Since being airborne is by definition loggable time, pausing while airborne does not make sense, so unpausing when the pilot takes off is a failsafe in case the pilot forgets to unpause the flight (for example, after refueling the aircraft). When an engine stop time is recorded the system should unpause the flight, because the engine stop indicates the end of the flight. Once the flight leaves the "paused" state, it performs step 1207 where the total time since the last pause time (from step 1204) is added to the running total pause time (from step 1201) so that the total paused time for the flight is known.

Figure 13:
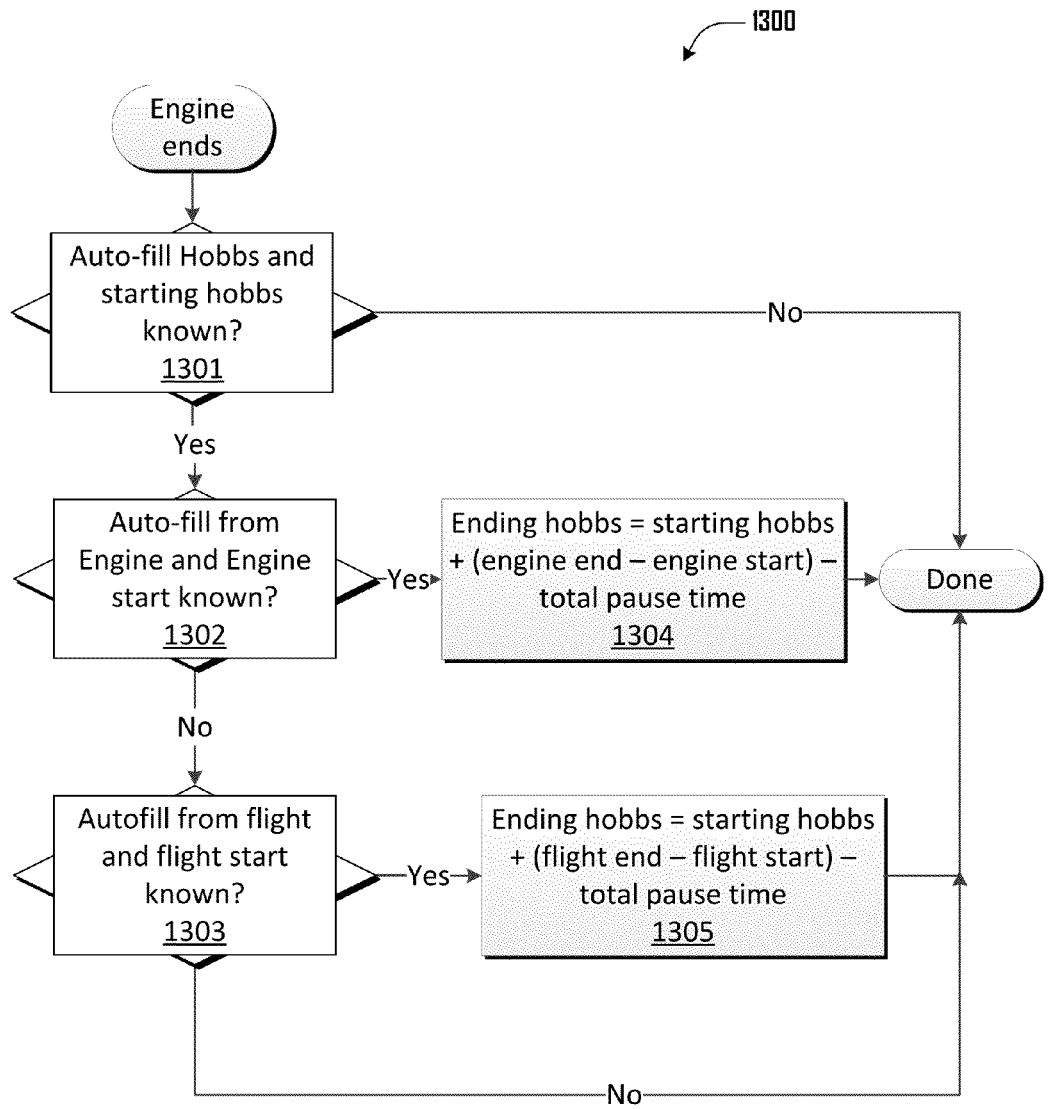
FIG. 13 illustrates a flow diagram of a portion of a log entry submission and reporting routine used to auto-fill time by the location-aware mobile device shown in FIG. 2 in accordance with one embodiment.

Referring now to FIG. 13, a flow diagram of a portion 1300 is shown of a log entry submission and reporting routine 280 used to auto-fill Hobbs time, by the location-aware mobile device previously shown in FIG. 2, in accordance with one embodiment. At the transition from an engine-running state to an engine-stopped state (i.e., at the conclusion of a flight), the system can auto-fill the total flight time and the ending Hobbs. These times are either computed as engine time (engine stop time minus engine start time) or as flight time (last landing time minus first takeoff time), depending on user preferences. Additionally, the total flight time can be based off of the Hobbs time (which in turn may be dependent on flight or engine time). The options for flight time and hobbs time are independent of one another: Hobbs meters in some airplanes only record flight time whereas in other airplanes they record engine time, but pilots are allowed (but not obligated) to record total time as engine start to engine stop if they do so with the intention to fly. As a result, the "total time for the flight" logged for the flight is often a little bit more than the total time in-flight, because it includes taxi and engine warm-up time. Additionally, depending on the route of flight, the pilot may be eligible to log Cross-country time.

In step (1301) of FIG. 13, if the pilot has not selected auto-fill of hobbs time OR if the starting hobbs time is unknown, then no action is taken. Otherwise, if the pilot in FIG. 13 has selected to auto-fill hobbs from engine time and both engine start and stop times are known (1302), then the ending hobbs time is computed as the starting hobbs time plus the difference between the engine stop and start times, minus the total pause time of the flight (1304). Otherwise, if the pilot in FIG. 13 has selected to auto-fill hobbs from flight time and both flight start and flight end times are known (1303), then the ending hobbs time is computed as the starting hobbs time plus the difference between the flight start and end times, minus the total pause time of the flight (1305). After hobbs time is auto-filled, the total time can be auto-filled.

Figure 14:
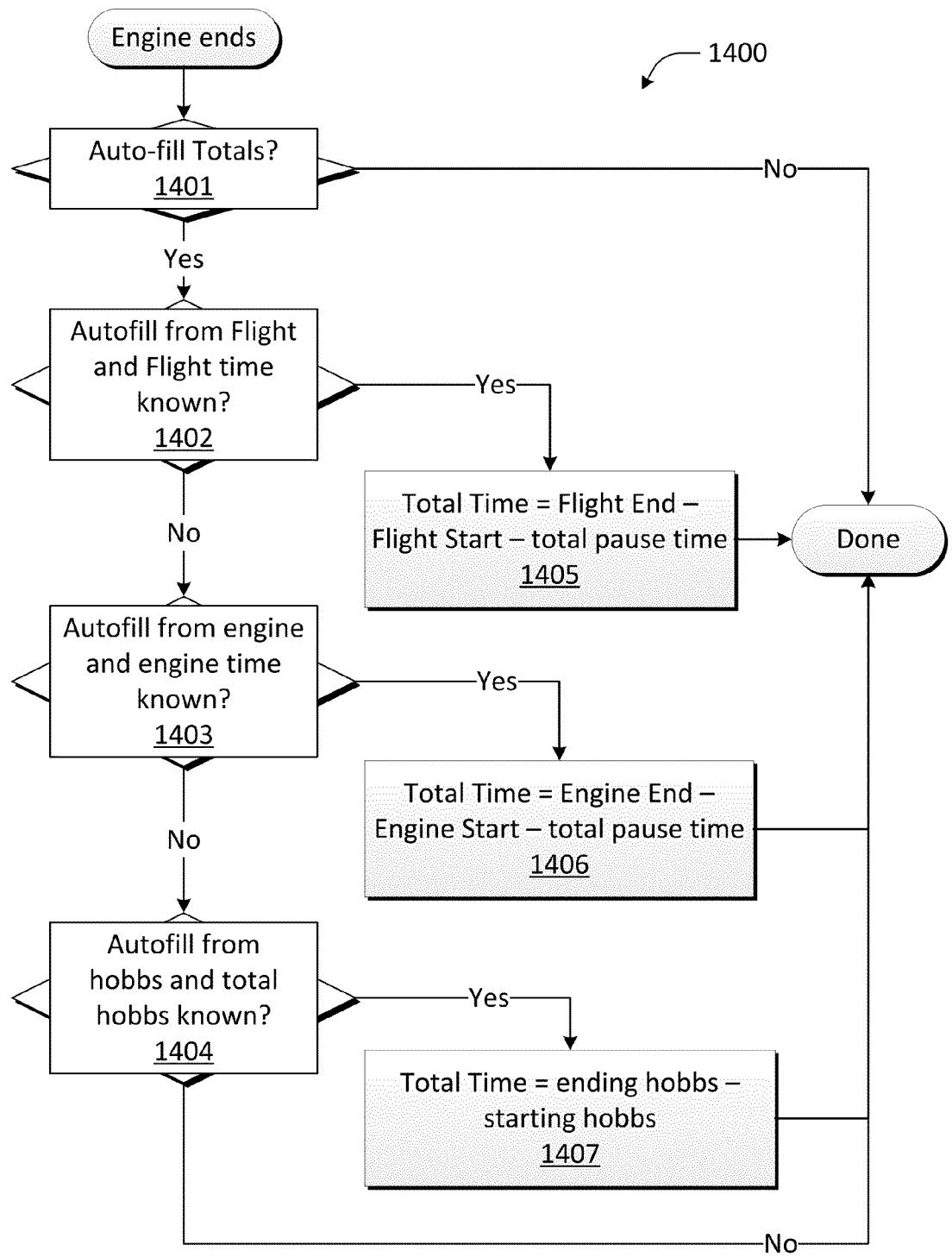
FIG. 14 illustrates a flow diagram of a portion of a log entry submission and reporting routine used to auto-fill total flight time by the location-aware mobile device shown in FIG. 2 in accordance with one embodiment.

Referring now to FIG. 14, a flow diagram of a portion 1400 is shown of a log entry submission and reporting routine 280 used to auto-fill total flight time, by the location-aware mobile device previously shown in FIG. 2, in accordance with one embodiment. Auto-fill of total time is done in a manner similar to the auto-fill of hobbs. If the pilot has not selected to auto-fill total time (1401), no action is taken. Otherwise, if the pilot has selected to auto-fill total time from flight time and both flight start and end times are known (1402), then the total time is computed as the difference between the flight start and end times, minus the total time that the flight was paused (1405). Otherwise, if the pilot has selected to auto-fill total time from engine time and both engine start and end times are known (1403), then the total time is computed as the difference between the engine start and end times, minus the total time that the flight was paused (1406). Otherwise, if the pilot has selected to auto-fill total time from hobbs time and both hobbs start and end are known (1404), then the total time is computed as the difference between hobbs start and end (1407). Once auto-fill of totals is complete with a valid value for the totals, the flight can be checked to see if cross-country time should also be filled in.

Figure 15:
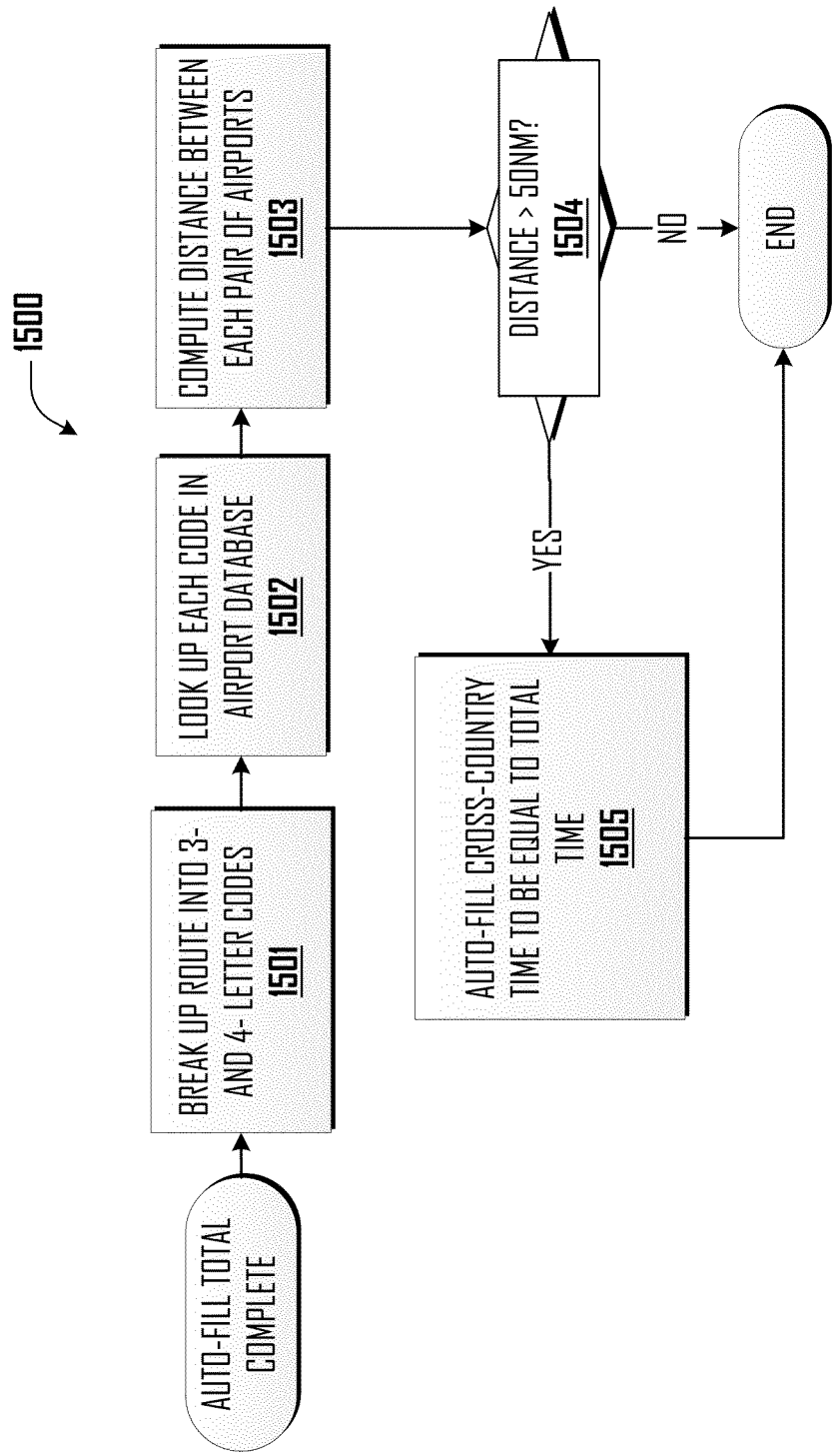
FIG. 15 illustrates a flow diagram of a portion of a log entry submission and reporting routine used to auto-fill cross country time by the location-aware mobile device shown in FIG. 2 in accordance with one embodiment.

Referring now to FIG. 15, a flow diagram of a portion 1500 of a log entry submission and reporting routine 280 used to auto-fill cross country time, by the location-aware mobile device previously shown in FIG. 2, in accordance with one embodiment. In FIG. 15, once an auto-fill value for total time for the flight is successfully completed, the route of flight is broken into 3- and 4-letter codes (1501). This is because airport codes are 3- or 4-letters long. (In the US, airports begin with "K", but the "K" is often dropped.) E.g., "JFK-Boston-KLGA" would produce "JFK" (John F. Kennedy Airport in New York) and "KLGA" (LaGuaria airport in New York); "Boston" is not a 3- or 4-letter word and thus is not a candidate for an airport code. Each airport is looked up by code from the database of airports (1502), and the latitude/longitude for each airport is retrieved for each airport that is found in the database. The distance between each pair of airports found in (1502) is then computed in step (1503), using a great circle distance. In query block 1504 of FIG. 15, if any distance from (1503) is found to be greater than the threshold for Cross Country flight (e.g., 50 nautical miles), then the cross-country time for the flight is filled in with the value that was used to auto-fill the total (1505) otherwise the portion 1500 of the reporting routine 280 ends.

Figure 16:
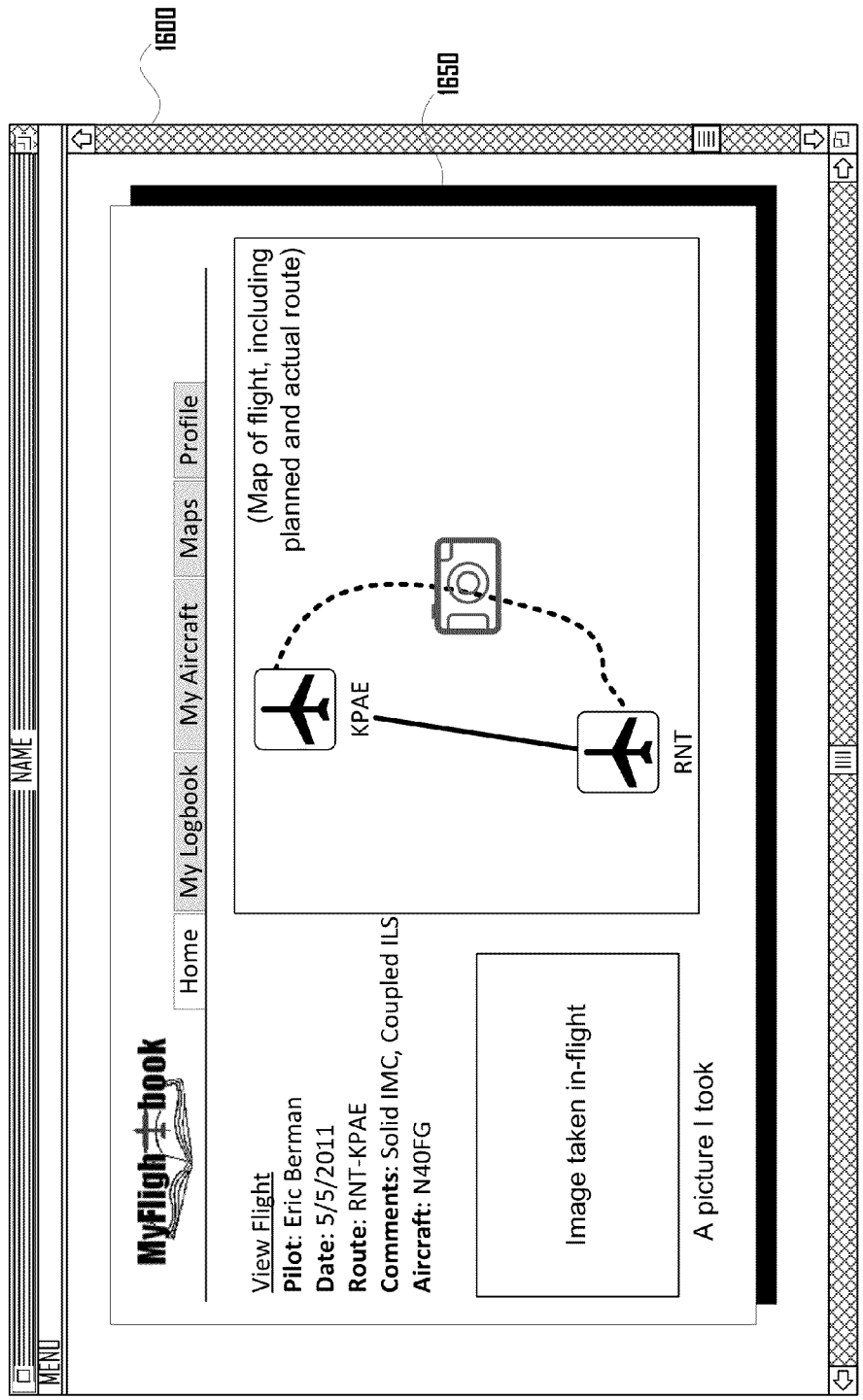
FIG. 16 illustrates a screenshot of a flight entry in a pilot's flight logbook that includes a geotagged picture in accordance with one embodiment.

Referring now to FIG. 16, a screenshot 1600 is shown of Picture Geotagging 1650 in accordance with one embodiment. When pilots fly for fun, it is quite common to want to take pictures. But it can be difficult to determine what the picture was of or where it was taken is after the fact. Location-aware mobile devices, such as smartphones and tablets, help address this problem by enabling the user pilot to take a picture with the device's built-in camera, and then automatically add latitude/longitude information to the picture, and store the image with the record of the flight in the pilot's flight logbook. In one embodiment, a pilot may also geotag video taken using the camera of the location-aware mobile device and append it to the flight information. In FIG. 16, when the flight is displayed on a map, an icon can then be overlayed on the map, showing where the image was taken, or the image can include a link to zoom the map to its location. In one embodiment, the process of geotagging of images uses EXIF and adds overlays of and callouts over maps. In one embodiment, the system The system provides easy integration of this functionality with a pilot flight logbook and a location-aware device used in-flight to help pilots share multimedia of the beautiful vistas that they experience.

Figure 17:
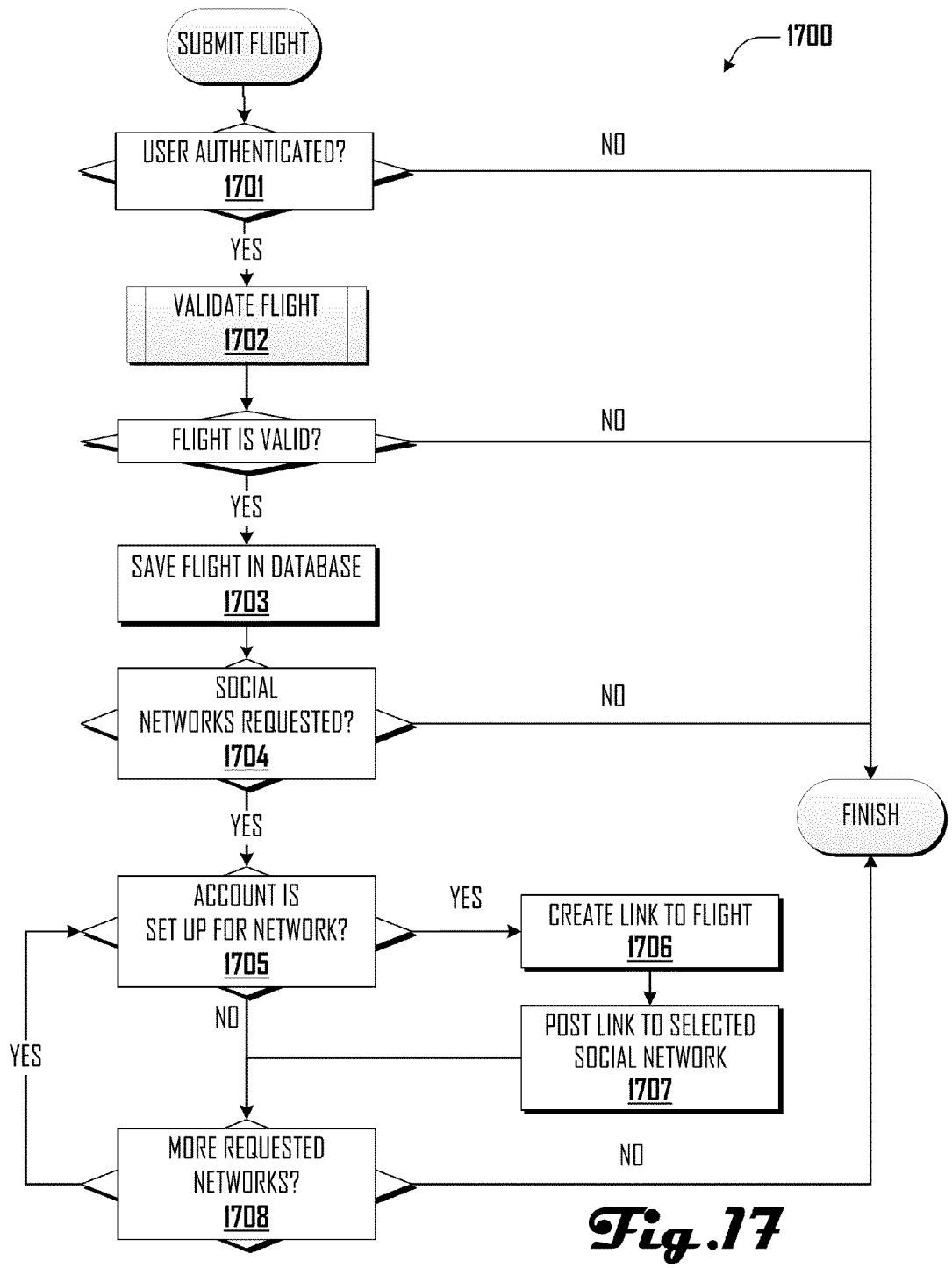
FIG. 17 illustrates a flow diagram of a portion of a posting routine used by the location-aware mobile device shown in FIG. 2 and a publishing/posting routine used by the flight logbook server previously shown in FIG. 3 in accordance with one embodiment.

Referring now to FIG. 17, a flow diagram of a portion 1700 of a publishing/posting routine 380 used by the flight logbook server previously described in FIG. 3 is shown in accordance with one embodiment. For social networking integration, the user can select on the device from among several popular social networking sites (currently Facebook and Twitter, but any number can be supported). The user can additionally choose how much detail to expose about the flight: if the flight is marked as being shared, then details such as the pilot's name, the aircraft and type, and any pictures associated with the flight are displayed to visitors. Otherwise, all details other than the date of the flight and the route (airport-to-airport) are suppressed. Obviously, any range of settings in between these could be offered as well, but these were the simplest to use. When the user submits the flight, they check boxes indicating which (if any) social networks on which to share the flight. This simply sets flags which are passed up along with the flight to the flight logbook server. After storing the flight in the database, a web link ("URL") to the flight is generated for and passed to each selected social network, along with either the user-provided description of the flight (e.g., "Flew with Joe to Chelan for lunch") or a generic comment that is generated by the server (e.g., "Flight added."). The link itself uses a straightforward and well established method for identifying a requested resource: it is a static link back to the server website, with an appended parameter that identifies the flight being requested. The mechanisms by which The mobile flight logbook system posts the link to social networks such as Facebook or Twitter are well established, but could be via any protocol.

In FIG. 17, when a flight is submitted to the server, it includes authentication credentials that were retrieved at an earlier time. Those credentials are checked (1701) to authenticate the user before saving a flight under their name in the database. The flight data is validated in step 1702, see e.g. FIG. 18 described below, to ensure the basic integrity of the flight. If the authentication check and integrity/validation check succeed, the flight is saved (1703). If either check fails, an error is returned and the flight is not stored. The request to save the flight also indicates on which of a plurality of social networks the user wishes to post a link to the flight. If social networks are requested (1704), then the system checks for each one in turn whether the account has an authorization token that enables posting to the network on the user's behalf (1705), and if so it creates a URL link to the flight (1706) and posts that link on the network (1707) along with any comments or images from the flight that the pilot has elected to share (see below for privacy discussion). It then checks to see if there are more requested social networks (1708) and repeats steps 1705, 1706, and 1707 for each of the remaining networks. In one embodiment, the link is nothing more than a URL (e.g., http://myflightbook.com/flight/15 could identify the 15th flight in the database) that uniquely identifies the flight in the database. In one embodiment, a prerequisite for social network integration may be that the user has pre-configured their account so that the mobile flight logbook system is authorized to post on their behalf. This could be as simple as providing their username and password for the network to the mobile flight logbook system, but typically a more secure mechanism (such as oAuth) is used.

Figure 18:
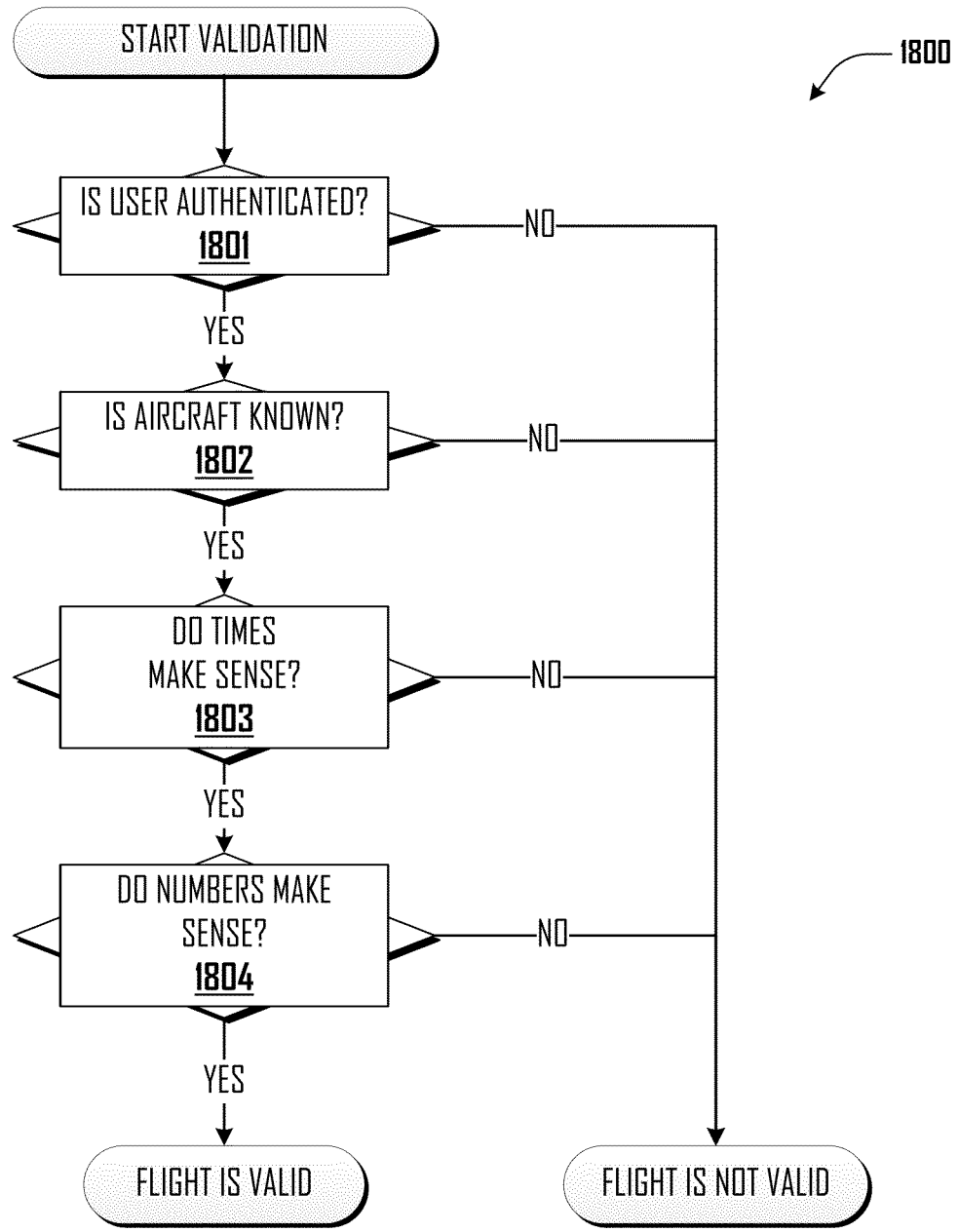
FIG. 18 illustrates a flow diagram of a portion of a receiving routine used by the flight logbook server shown in FIG. 3 in accordance with one embodiment.

Referring now to FIG. 18, a flow diagram is shown of a validation portion 1800 of a publishing/posting routine used by the flight logbook server previously shown in FIG. 17 in accordance with one embodiment. There are several checks to ensure that a submitted flight is appropriate to save. In one embodiment, shown in FIG. 18, a representative set of validity checks that might be used by the flight logbook server is illustrated; but other checks are possible. Moreover, in one embodiment, some of the validation checks are applied at the location-aware mobile device.

In FIG. 18, the first check (1801) is to see if the entity doing the submission has been authenticated as a user on the system. Every pilot who uses the system has a unique username and password and they must periodically sign-in with the correct username and password. Each flight is associated with the creating pilot, and only that pilot may view (other than per the sharing described below), modify, or delete the flight. If the user is not authenticated, or if the user is trying to update or delete a flight that does not belong to them, the submission is rejected.

All flights require an aircraft, and the second check (1802) in FIG. 18 is to see if the aircraft for the flight is known to the system. In the current embodiment, pilots enter an aircraft into the system first and then reference that aircraft from subsequent flights, but alternatively a description of the aircraft could be included as part of the flight submission itself. The system must know about the aircraft for each flight in order to properly compute flying totals and currency, as described earlier, since different aircraft makes/models are counted differently.

The $3^{rd}$ check (1803) in FIG. 18 is to ensure basic coherency with dates and times. For example, the time of the first take-off (if specified) must precede the time of the last landing. The ending hobbs (if specified) must be greater than the starting hobbs.

Finally, other numbers are checked in FIG. 18 to ensure consistency (1804). For example, if the flight specifies full-stop landings, touch-and-go landings, and total landings, then the total landings count should not be less than the sum of the full-stop and touch-and-go landings. Of these checks illustrated in FIG. 18, only (1801) is critical. Checks (1802)-(1804) in FIG. 18 are done as a convenience to try to help keep the pilot from accidentally storing faulty data, but a given embodiment could choose to either be lax or strict here. For example, a lax embodiment that does not conduct any of the checks (1802)-(1804) might still have valid data to store.

Figure 19:
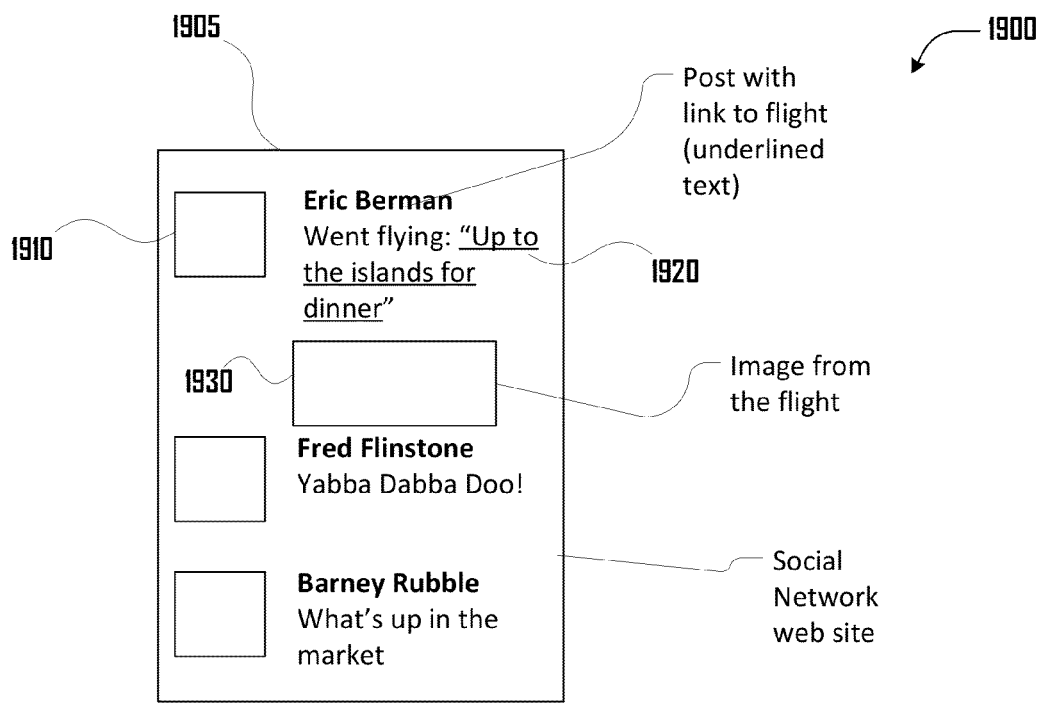
FIG. 19 illustrates a screenshot of a Flight Post to a Social Network news feed in accordance with one embodiment.

Referring now to FIG. 19, a screenshot 1900 of a flight post 1910 to a Social Network news feed 1905 is shown in accordance with one embodiment. Once a flight is validated it may be posted to designated newsfeeds associated with at least one Social Network. When the flight is posted to a social network, it typically appears in the news feed of their friends. They (the pilot's friends) might see something like the screenshot 1900 in FIG. 19 when they view their social network news feed on a web browser or even using a smartphone or other device. If the pilot's friend viewing the news feed 1905 clicks on the link 1920 associated with the pilot's flight post 1910, they are taken to the website that displays the flight.

Figure 20:
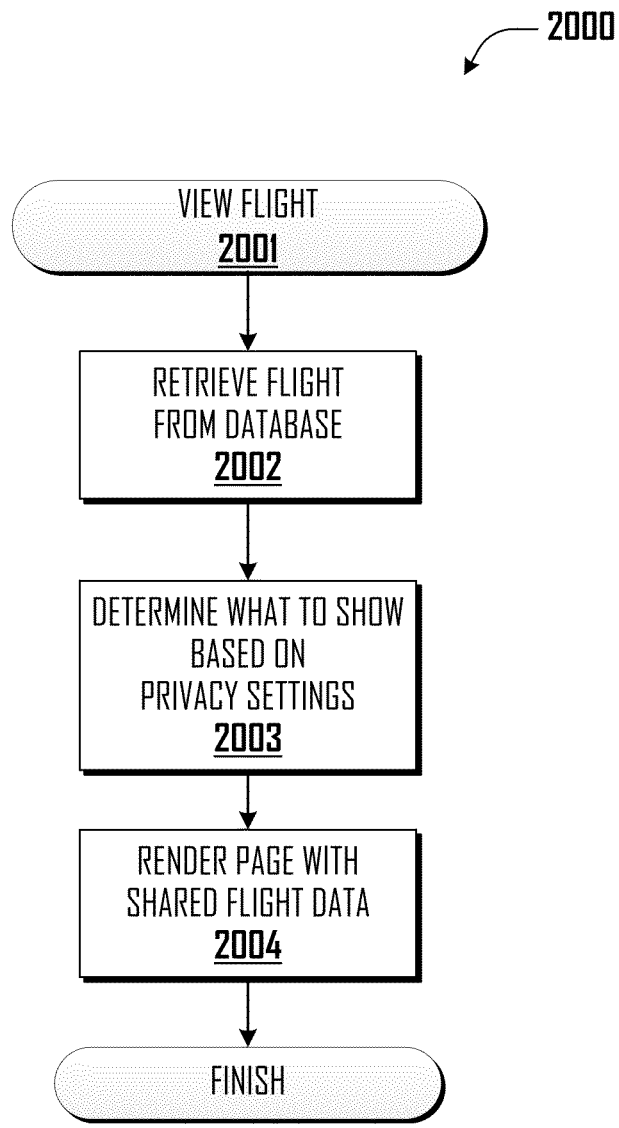
FIG. 20 illustrates a flow diagram of a portion of a publishing/posting routine used by the flight logbook server shown in FIG. 3 in accordance with one embodiment.

Referring now to FIG. 20, a flow diagram is shown of a portion 2000 of a publishing/posting routine 380 used by the flight logbook server previously shown in FIG. 3 in accordance with one embodiment. Initially, in FIG. 20, when a visitor to the pilot's page on a social network sees the posted link and clicks on the post to view the flight (2001), they are brought to the web application's website. The flight information is retrieved (2002) and its privacy settings are checked (2003) to determine what information to show. In the current embodiment, the privacy setting is a very simple "all" or "nothing but the route on a map" setting, but alternative embodiments could be arbitrarily granular. The page is then rendered (2004) and returned to the pilot's friend's browser for display.

For privacy reasons, pilots can control how much detail about the flight is revealed to their friends (or to anybody else who encounters the link to the flight.) Each flight is stored with a set of flags that determine how much (or little) information is shown. In a simple embodiment such as shown here, this can be a simple flag that determines whether to show or hide all detail; in alternative embodiments, this could be a set of flags and settings that determine what is shown or hidden at a much more granular level. For example, one flag could determine whether the pilot's name is displayed, another flag could determine whether photos are displayed, and another could determine whether the route of flight is shown. In one embodiment, the pilot determines how much of a flight to share and this determination is stored as a property of the flight.

Figure 21:
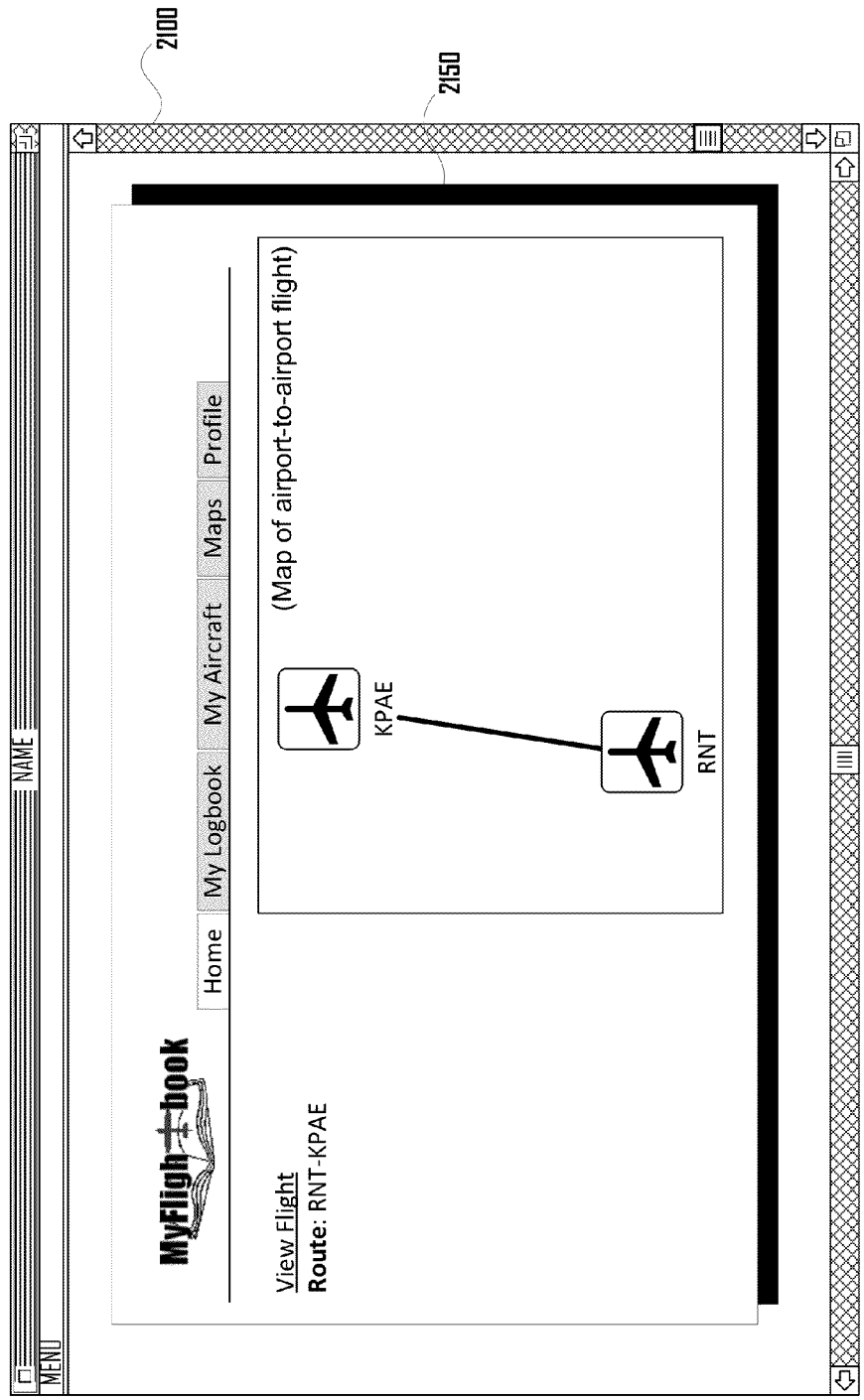
FIG. 21 illustrates a screenshot of a flight that restricts shared flight information in accordance with one embodiment.

An example of a flight with lots of public information was shown previously in FIG. 16. In contrast, FIG. 21 provides an example screenshot 2100 of a flight 2150 with very restrictive display settings. The decision about how private the flight is can be made or changed at any time, but the link that is posted to the social network typically cannot be updated after the fact. Therefore when a friend of the pilot clicks on a link to a pilot's flight and comes to view it on the flight logbook server, a decision about the level of detail to show is made by the flight logbook server at that instant based on the current settings for the flight.

As with geotagged pictures previously discussed, the mobile flight logbook system enables the designated social networks to be integrated with a pilot's logbook, so that pilots can share their flights with friends directly from their logbooks at the instant that the flight is entered into the logbook. In one embodiment, a distinct link syntax could be used for each social network so that the server could display different data to visitors depending on which social network they arrived from.

Figure 22:
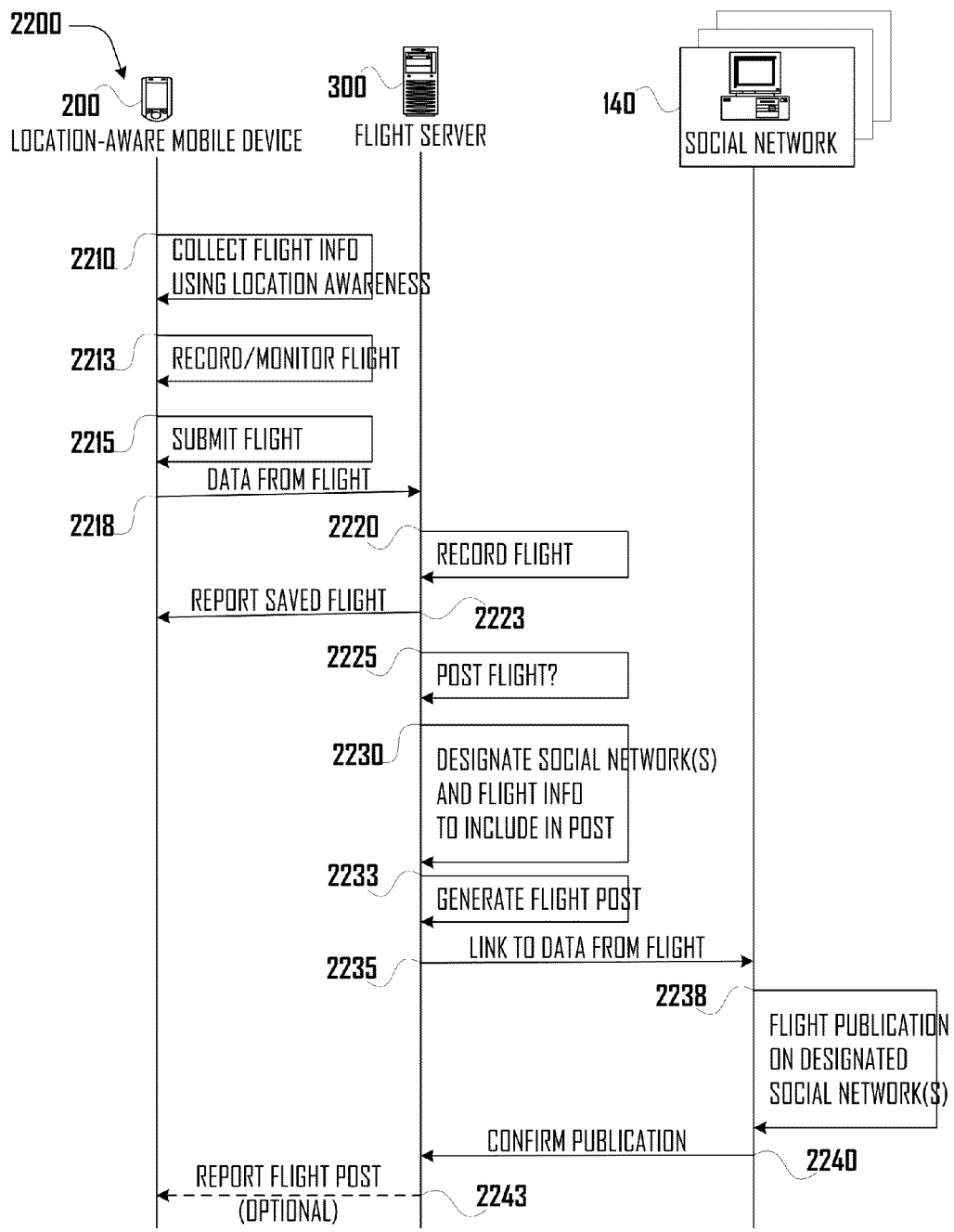
FIG. 22 illustrates a series of communications between various devices of flight information associated with a flight logbook in accordance with one embodiment.

Referring now to FIG. 22, a series of communications 2200 between a location-aware mobile device 200, a flight logbook server 300, and at least one social network 140 is shown reporting flight information for a flight logbook in accordance with one embodiment. The illustrated series of communications shows one scenario in which the location-aware mobile device 200 generates an entry for a flight logbook. The illustrated sequence of events is provided as an example for illustrative purposes. In other embodiments, a similar flight generation process may be obtained via a different sequence of events.

Figure 29:
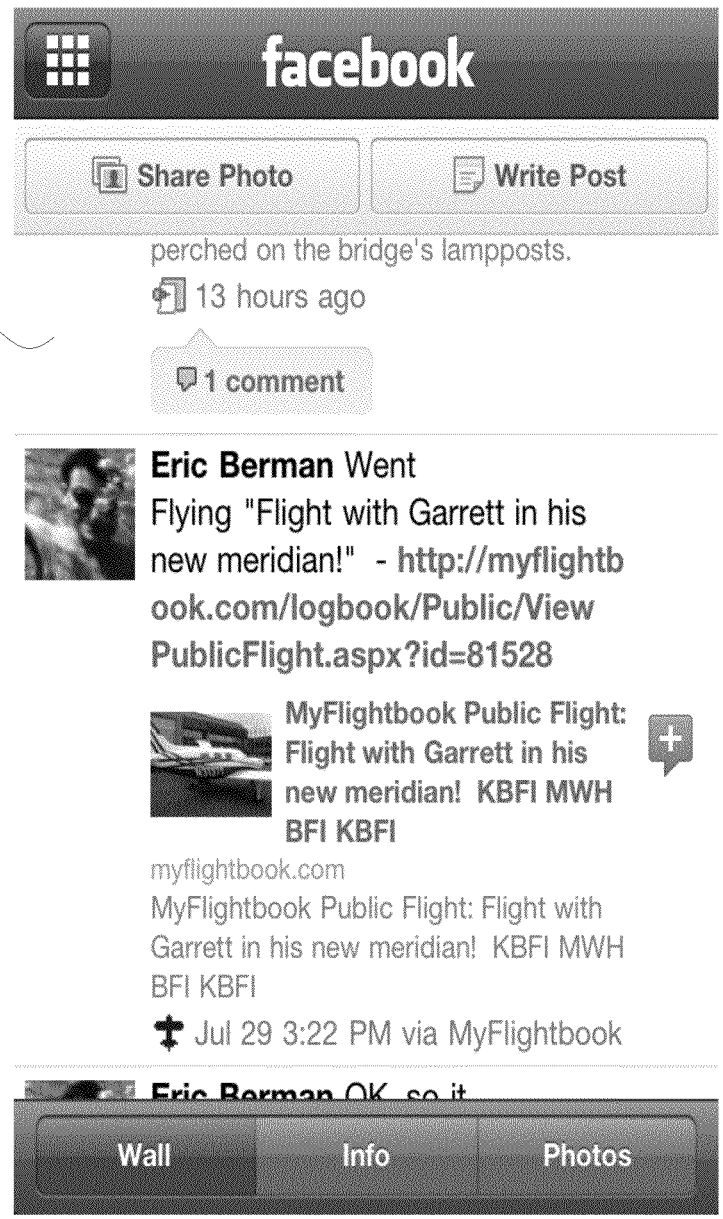
FIG. 29 illustrates a screenshot of a flight posted to a user wall in Facebook in accordance with one embodiment.

Beginning the illustrated sequence of operations, the location-aware mobile device 200 collects 2210 flight information data using location awareness for inclusion in an entry to a flight logbook. During the flight, the location-aware mobile device 200 records and monitors 2213 the flight. Upon completion of the flight, the location-aware mobile device 200 submits 2215 the flight information by generating the entry. Once compiled, the location-aware mobile device 200 may upload 2218 the flight information to the flight logbook server 300. Upon receiving the entry, the flight logbook server 300 records 2220 the received flight in the flight logbook and optionally reports 2223 the saved flight to the location-aware mobile device 200. In one embodiment, the location-aware mobile device may then delete the locally stored copy of the flight information in preparation for the next flight. The flight logbook server 300 then determines 2225 whether to post the flight. In one embodiment, this determination is made based on stored pilot preferences and any received flight preferences included in the received flight information. If the flight logbook server 300 determines the flight should be posted, the flight logbook server 300 designates 2230 the social networks and flight information to include in a post. The flight logbook server generates 2233 the post based on settings associated with each selected social network. In one embodiment, the post includes a title and link to the flight entry in the flight logbook. The flight logbook server 300 posts 2235 a link to selected data from the flight to at least one social network 140. Accordingly, the social network 140 publishes 2238 the flight to the various newsfeeds of the social network. One illustrative example of such a posting to Facebook® is shown in FIG. 29. Upon posting, the social network 140 confirms 2240 publication of the flight to the flight logbook server. The flight logbook server 300 may optionally report 2243 the flight post to the location-aware mobile device 200.

Figure 23:
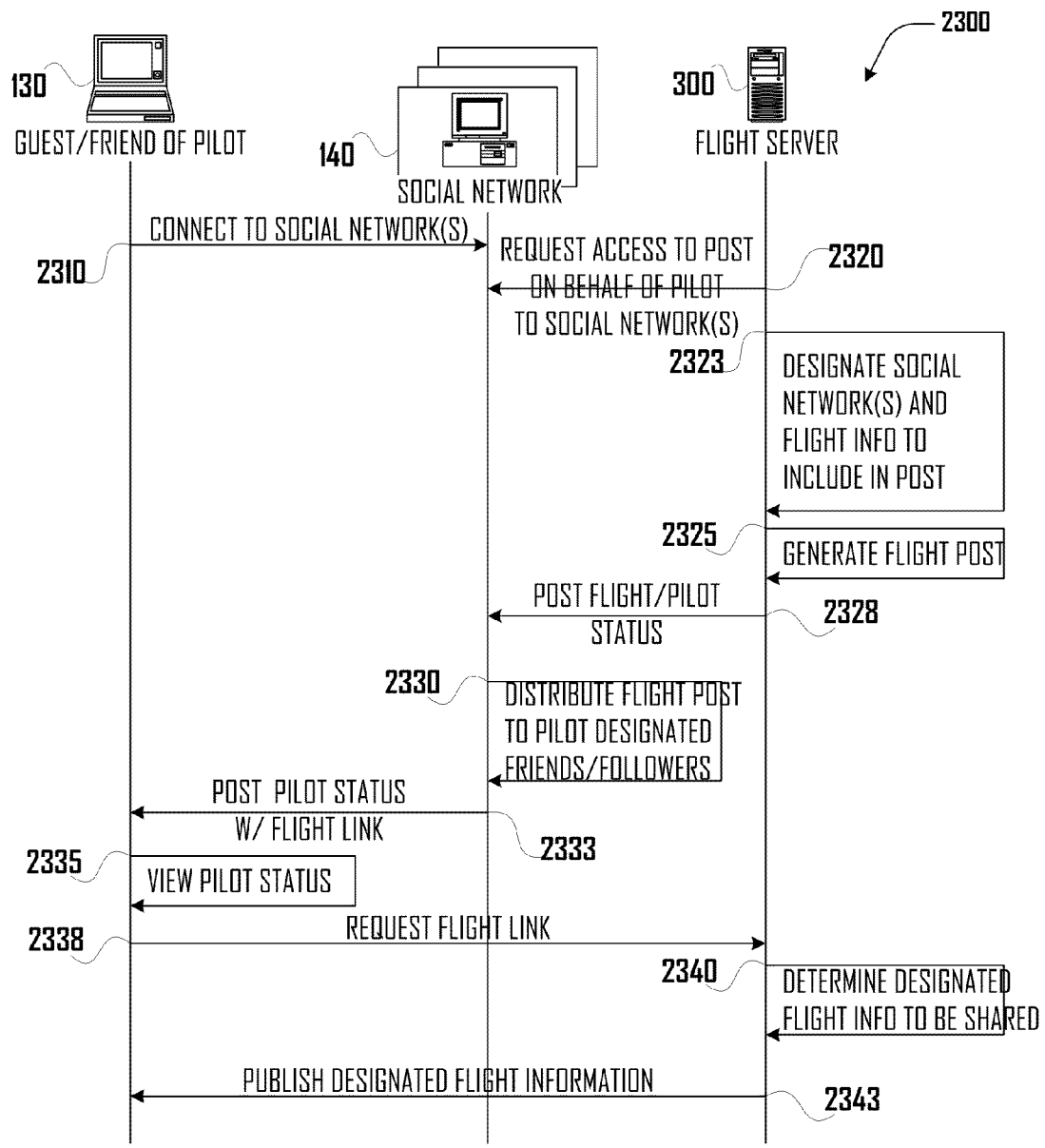
FIG. 23 illustrates a series of communications between various devices sharing a flight from a flight logbook in accordance with one embodiment.

Referring now to FIG. 23, a series of communications 2300 between a pilot's friend or guest device 130, a flight logbook server 300, and at least one social network 140 is shown sharing a flight from a flight logbook in accordance with one embodiment. The illustrated series of communications shows one scenario in which the flight logbook server 300 generates a post linked to an entry in a flight logbook. The illustrated sequence of events is provided as an example for illustrative purposes. In other embodiments, a similar flight post process may be obtained via a different sequence of events.

Beginning the illustrated sequence of operations, the guest device 130 is connected 2310 to at least on social network 140. In one embodiment, the log-in process may authenticate the guest user and subsequently entitle the guest user to receive updates to the newsfeed including posts by the pilot. In one embodiment, the flight logbook server 300 also requests 2320 access to post on behalf of the pilot to a social network 140. This process is described in greater detail in FIG. 24, which illustrates one embodiment for obtaining a token representing authorization to post to the social network 140.

Upon receiving a new flight, the flight logbook server 300 may designate 2323 social networks and flight information to include in the flight post and generate 2325 the flight post. The flight logbook server 300 posts 2328 the generated flight/pilot status. In one embodiment, the generated post may include a title and a link back to the flight logbook of the pilot. The social network 140 may then distribute 2330 the flight post to friends and followers designated by the pilot using newsfeeds and distribution mechanisms associated with the social network 140. In this manner, the pilot status with flight link is posted 2333 to the guest device 130. The user may then optionally view 2335 the status and follow the link for more flight information. In the case where the guest user follows 2338 the link, a request is sent to the flight logbook server 300. Upon receiving the request, the flight logbook server 300 determines 2340 what, if any, of the designated flight information may be shared with the requesting user and publishes 2343 authorized flight information from the flight logbook previously designated by the pilot.

Figure 24:
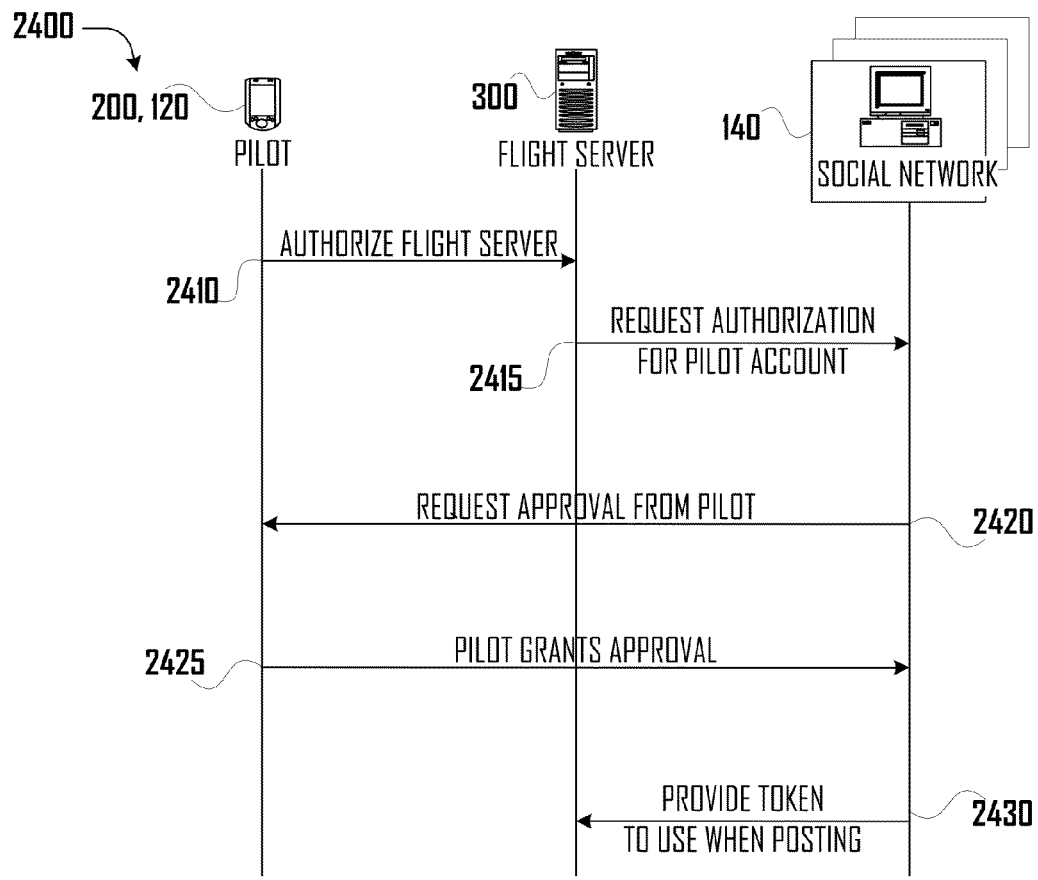
FIG. 24 illustrates a series of communications between various devices authorizing posting from a flight logbook to a social network account in accordance with one embodiment.
Figure 25A:
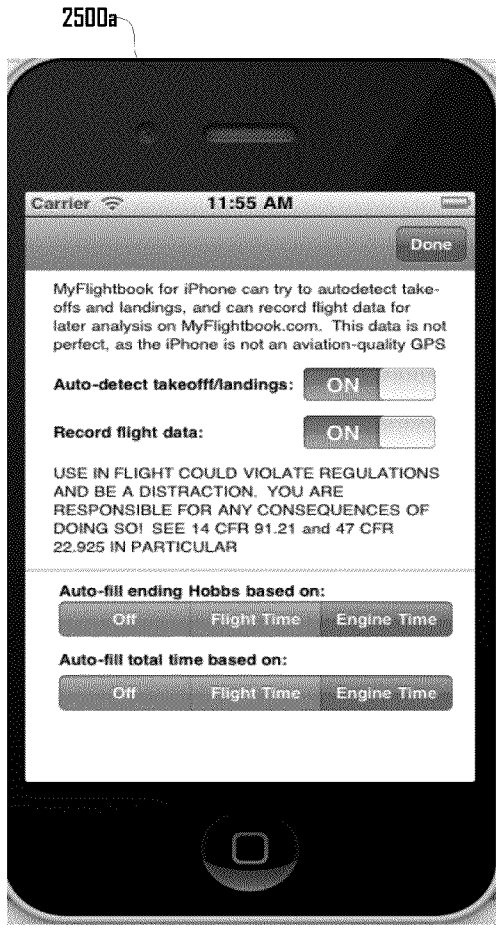
FIG. 25A illustrates a screenshot of flight location settings for an iPhone application in accordance with one embodiment.
Figure 25B:
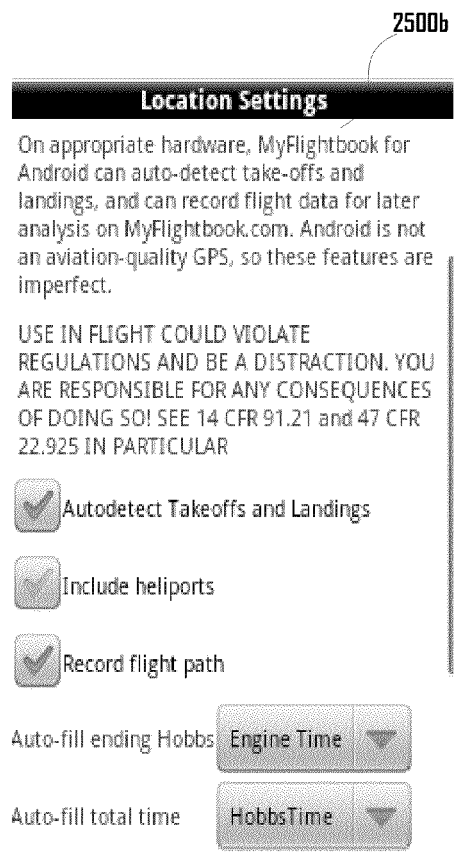
FIG. 25B illustrates a screenshot of flight location settings for an Android application in accordance with one embodiment.
Figure 26A:
FIG. 26A illustrates a screenshot of flight autodetection settings for an iPhone application in accordance with one embodiment.
Figure 26B:
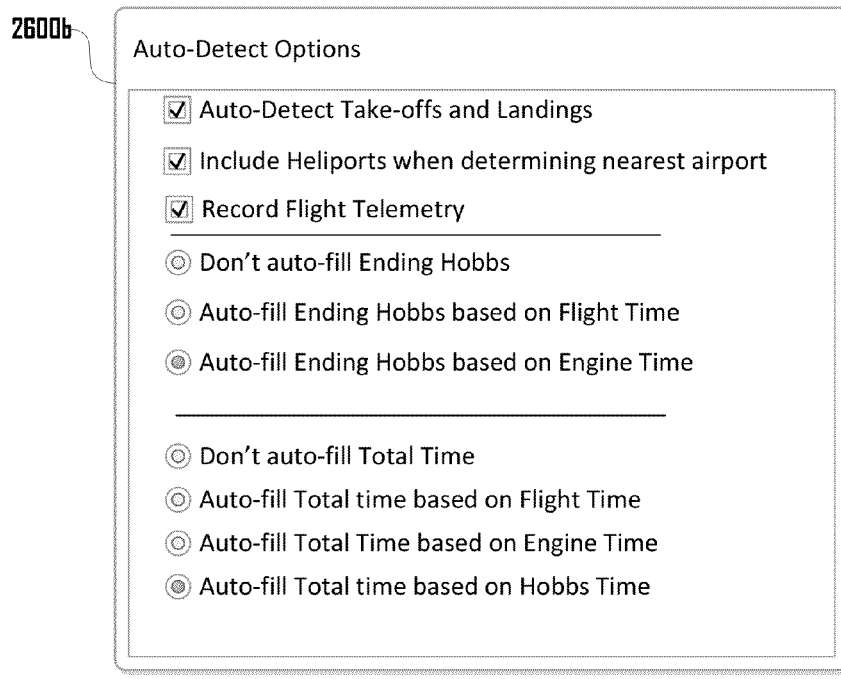
FIG. 26B illustrates a screenshot of flight autodetection options for an Android application in accordance with one embodiment.
Figure 27A:
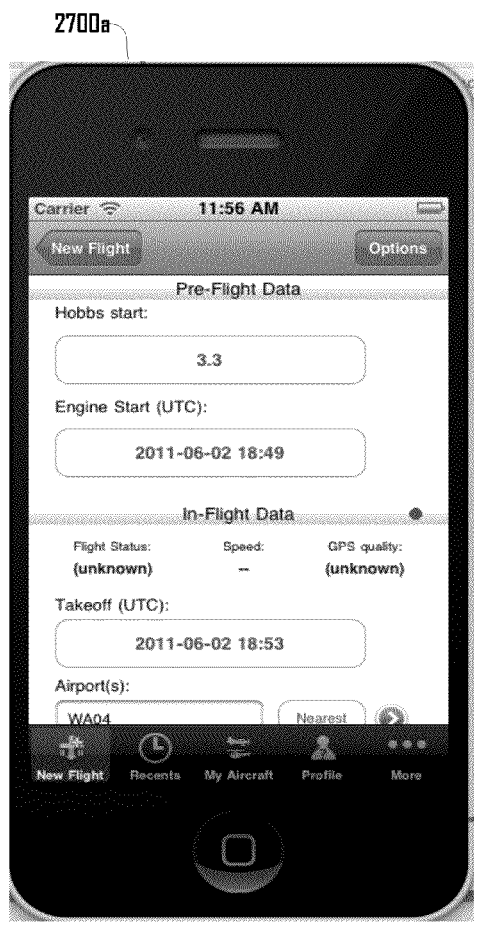
FIG. 27A illustrates a screenshot of an in-flight mobile flight logbook application for an iPhone in accordance with one embodiment.
Figure 27B:
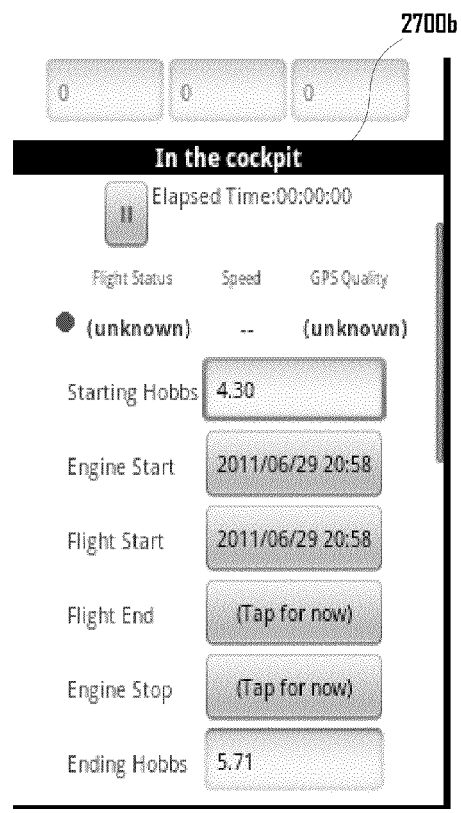
FIG. 27B illustrates a screenshot of an in-flight mobile flight logbook application for an Android Smartphone in accordance with one embodiment.
Figure 28A:
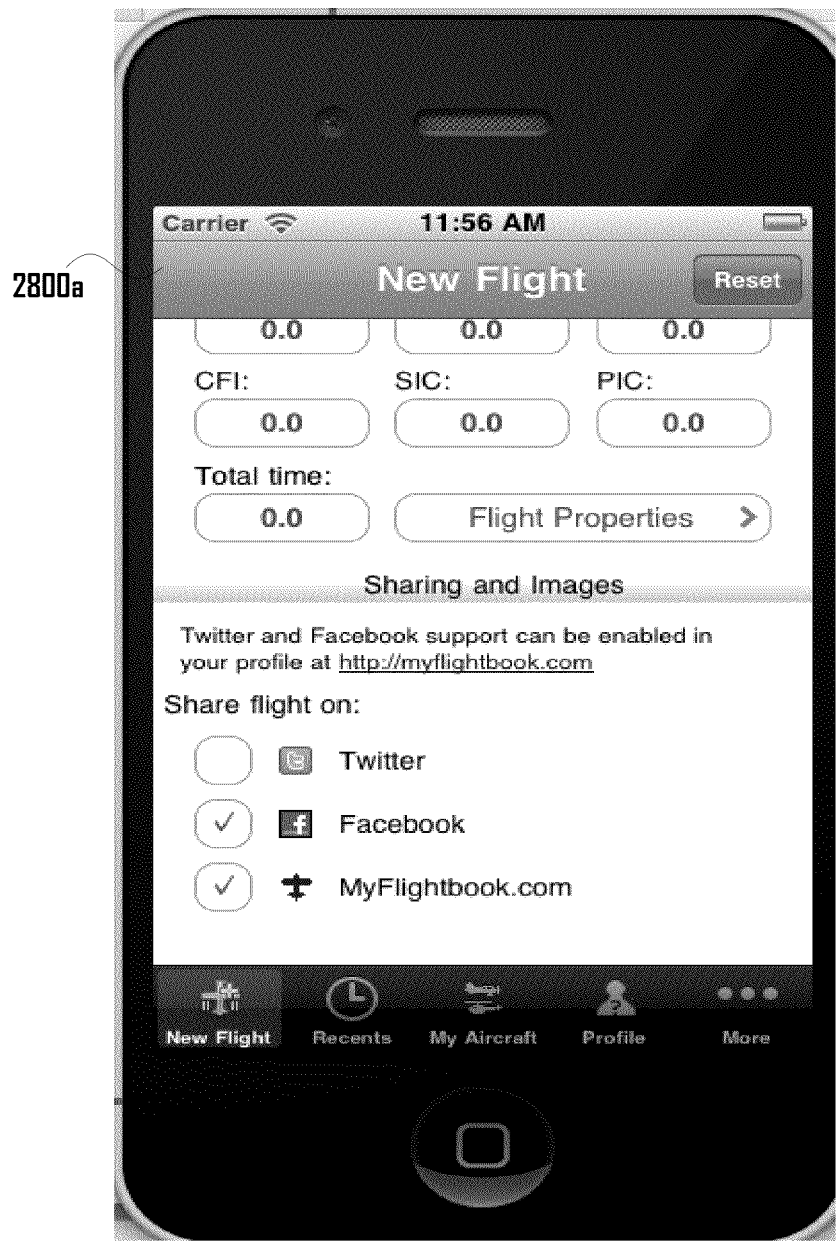
FIG. 28A illustrates a screenshot of a new flight data entry page for an iPhone application in accordance with one embodiment.

Referring now to FIG. 24, a series of communications 2400 between pilot devices (200, 120), the flight logbook server 300, and at least one social network 140 is shown in accordance with one embodiment. The series of communications 2400 authorizing posting from a flight logbook to a social network account in accordance with one embodiment. More specifically, the illustrated series of communications 2400 shows one scenario in which the pilot authorizes the flight logbook server 300 to post to a social network 140 on the pilot's behalf. The illustrated sequence of events is representative of Open Authorization (OAuth) and is provided as an example for illustrative purposes. OAuth allows users to hand out tokens instead of credentials to their data hosted by a given service provider. In other embodiments, a similar flight post process may be obtained via a different sequence of events.

Beginning the illustrated sequence of operations, the pilot authorizes 2410 the flight logbook server 300 to post to a designated social network 140. The flight logbook server 300 then requests 2415 authorization from the social network 140 to post to the pilot's account. In turn, the social network 140 requests 2420 approval directly from the pilot. When the pilot grants 2425 approval the social network 140 may provide 2430 a token to the flight logbook server 300 to use when posting flights.

FIGS. 25-29 show various screenshots for existing implementations of a location-aware mobile device. More specifically, FIG. 25A illustrates a screenshot of flight location settings for an iPhone application in accordance with one embodiment. FIG. 25B illustrates a screenshot of flight location settings for an Android application in accordance with one embodiment. FIG. 26A illustrates a screenshot of flight autodetection settings for an iPhone application in accordance with one embodiment. FIG. 26B illustrates a screenshot of flight autodetection options for an Android application in accordance with one embodiment. FIG. 27A illustrates a screenshot of an in-flight mobile flight logbook application for an iPhone in accordance with one embodiment. FIG. 27B illustrates a screenshot of an in-flight mobile flight logbook application for an Android Smartphone in accordance with one embodiment. FIG. 28A illustrates a screenshot of a new flight data entry page for an iPhone application in accordance with one embodiment. FIG. 28B illustrates a screenshot of a new flight data entry page for a tablet in accordance with one embodiment. FIG. 29 illustrates a screenshot of a flight posted to a user wall in Facebook® in accordance with one embodiment.

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for automatically generating an entry for a flight logbook on a flight server, the method comprising:
  detecting, by a remote location-aware mobile device, an aircraft takeoff;

monitoring, by the remote location-aware mobile device, a route of flight for an aircraft;

detecting, by the remote location-aware mobile device, an aircraft landing; and generating, by the remote location-aware mobile device, the entry for the flight logbook, based on flight information provided by the remote location-aware mobile device, the entry including an actively updated number of landings.

2. The method of claim 1, further comprising reporting the entry as generated by the remote location-aware mobile device to a flight server for addition to the flight logbook.

3. The method of claim 1, further comprising transmitting flight information to a flight server over a network.

4. The method of claim 3, wherein the flight information includes images that are taken in-flight.

5. The method of claim 4, further comprising geo-tagging each image by the remote location-aware mobile device.

6. The method of claim 1, wherein the detecting of the aircraft takeoff and the detecting of the aircraft landing both include determining, at the time of detection, an airport nearest to the location of the remote location-aware mobile device and appending an airport identifier associated with the nearest airport to the route of flight of the flight entry.

7. The method of claim 6, wherein the appending includes adding the airport identifier of the nearest airport to the route of flight if the nearest airport is not already the last aircraft landing location of the route of flight.

8. The method of claim 1, wherein total flight time of the entry is based on engine time or flight time.

9. The method of claim 8, wherein the flight time is determined based on time of a first takeoff and on time of a most recently monitored landing.

10. The method of claim 1, wherein the detecting of the aircraft landing includes detecting a touch and go landing, a night landing, and/or a full stop landing.

11. A non-transient computer-readable medium having tangibly stored thereon instructions that, when executed by a processor, perform the method of claim 1.

12. A computer-implemented method for automatically maintaining a flight logbook for a pilot, the method comprising:

receiving, by a flight server via a network, flight information from at least one remote location-aware mobile device associated with the pilot, the flight information includes details of a flight that were detected as the flight progressed including an actively updated number of landings;

upon completion of the flight, generating an entry for the flight logbook associated with the pilot, based on flight information provided by the remote location-aware mobile device;

requesting authorization from the pilot to save the entry in the flight logbook associated with the pilot; and storing, by a flight server, an authorized entry in the flight logbook associated with the pilot.

13. The method of claim 12, further comprising requesting, by the flight server, pilot designation of flight information to be shared with at least one social network.

14. The method of claim 12, further comprising posting, by the flight server, flight information associated with a particular flight from the flight logbook to at least one social network.

15. The method of claim 14, wherein the posting includes individually designating relative to each social network specific types of flight information to include in each post.

16. A non-transient computer-readable medium having tangibly stored thereon instructions that, when executed by a processor, perform the method of claim 12.

17. A system for automatically maintaining a flight logbook for at least one pilot, the system comprising:

at least one location-aware mobile device associated with at least one pilot and configured to identify and collect flight information from active flights, for each active flight the remote location-aware mobile device collects flight information including an actively updated number of landings; and a flight server, in communication over a network with the remote location-aware mobile device, configured to maintain the flight logbook associated with at least one pilot.

18. The system of claim 17, further comprising at least one pilot client in communication over a network with the flight server and configured to access the flight logbook of a pilot.

19. The system of claim 17, further comprising at least one guest client in communication over a network with the flight server and configured to access designated flight information from the flight logbook of at least one pilot.

20. The system of claim 17, further comprising at least one social network in communication with the flight server and configured to link to designated flight information from the flight logbook of at least one pilot.

* * * * *